(12) United States Patent
Hirano et al.

(10) Patent No.: US 7,407,248 B2
(45) Date of Patent: Aug. 5, 2008

(54) IMAGE PROCESSING METHOD, PROGRAM, IMAGE PROCESSING DEVICE, IMAGE FORMING DEVICE, AND IMAGE FORMING SYSTEM

(75) Inventors: Masanori Hirano, Kanagawa (JP); Masakazu Yoshida, Kanagawa (JP); Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 11/582,495

(22) Filed: Oct. 16, 2006

(65) Prior Publication Data
US 2007/0085869 A1 Apr. 19, 2007

(30) Foreign Application Priority Data
Oct. 19, 2005 (JP) ............................. 2005-304351
Jun. 30, 2006 (JP) ............................. 2006-182201

(51) Int. Cl.
*B41J 2/205* (2006.01)
(52) U.S. Cl. ........................................ 347/15; 347/43
(58) Field of Classification Search ................. 347/15, 347/43
See application file for complete search history.

(56) References Cited
U.S. PATENT DOCUMENTS
6,578,944 B1  6/2003 Kamei et al.
6,916,092 B2 * 7/2005 Koitabashi et al. .......... 347/105
6,985,252 B1 * 1/2006 Kubo .......................... 358/1.9
7,083,247 B2  8/2006 Yoshida et al.

FOREIGN PATENT DOCUMENTS
JP  7-242036   9/1995
JP  11-320926  11/1999
JP  2005-1336  1/2005
JP  2005-1337  1/2005
JP  2005-170010 6/2005

* cited by examiner

*Primary Examiner*—Thinh H Nguyen
(74) *Attorney, Agent, or Firm*—Cooper & Dunham, LLP

(57) ABSTRACT

An image processing method performs processing to generate image data based on input data and output the image data to an image forming device. The image forming device includes a printing head in which first nozzles for ejecting color ink drops are arranged in a symmetrical formation to forward and backward scanning directions and second nozzles for ejecting black or gray ink drops are arranged in an unsymmetrical formation with respect to the first nozzles. The image forming device is adapted to perform a uni-directional printing or a bidirectional printing with the printing head. In the image processing method, a black generation processing to the input data is performed, and when performing the black generation processing, a black-generation start level for the bidirectional printing is delayed to a shadow-side gradation level from a black-generation start level for the uni-directional printing.

8 Claims, 20 Drawing Sheets

FIG.3
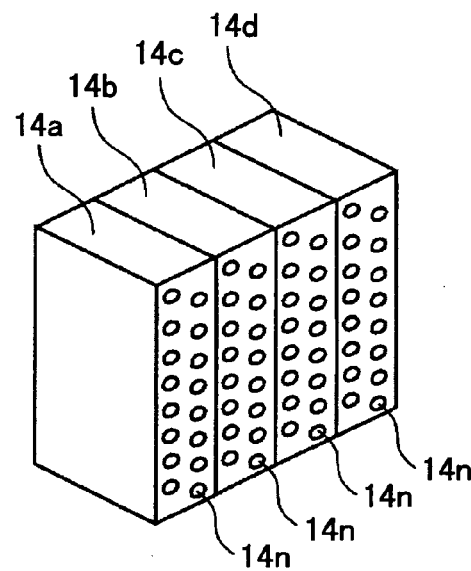
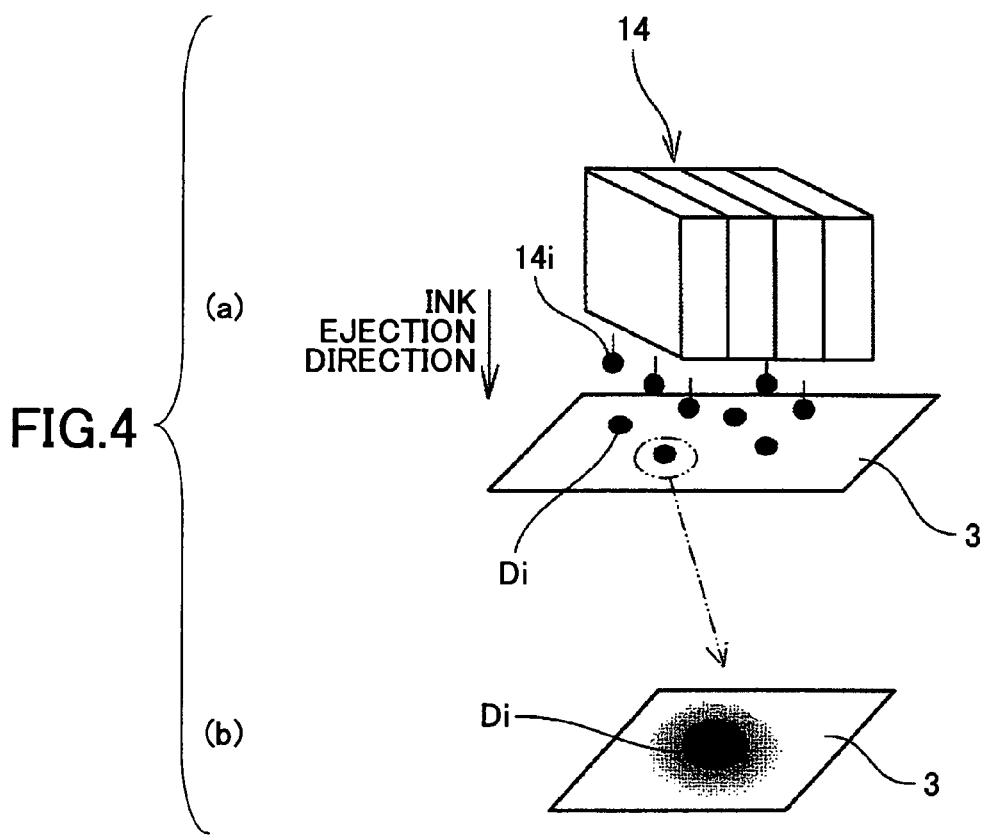
FIG.4

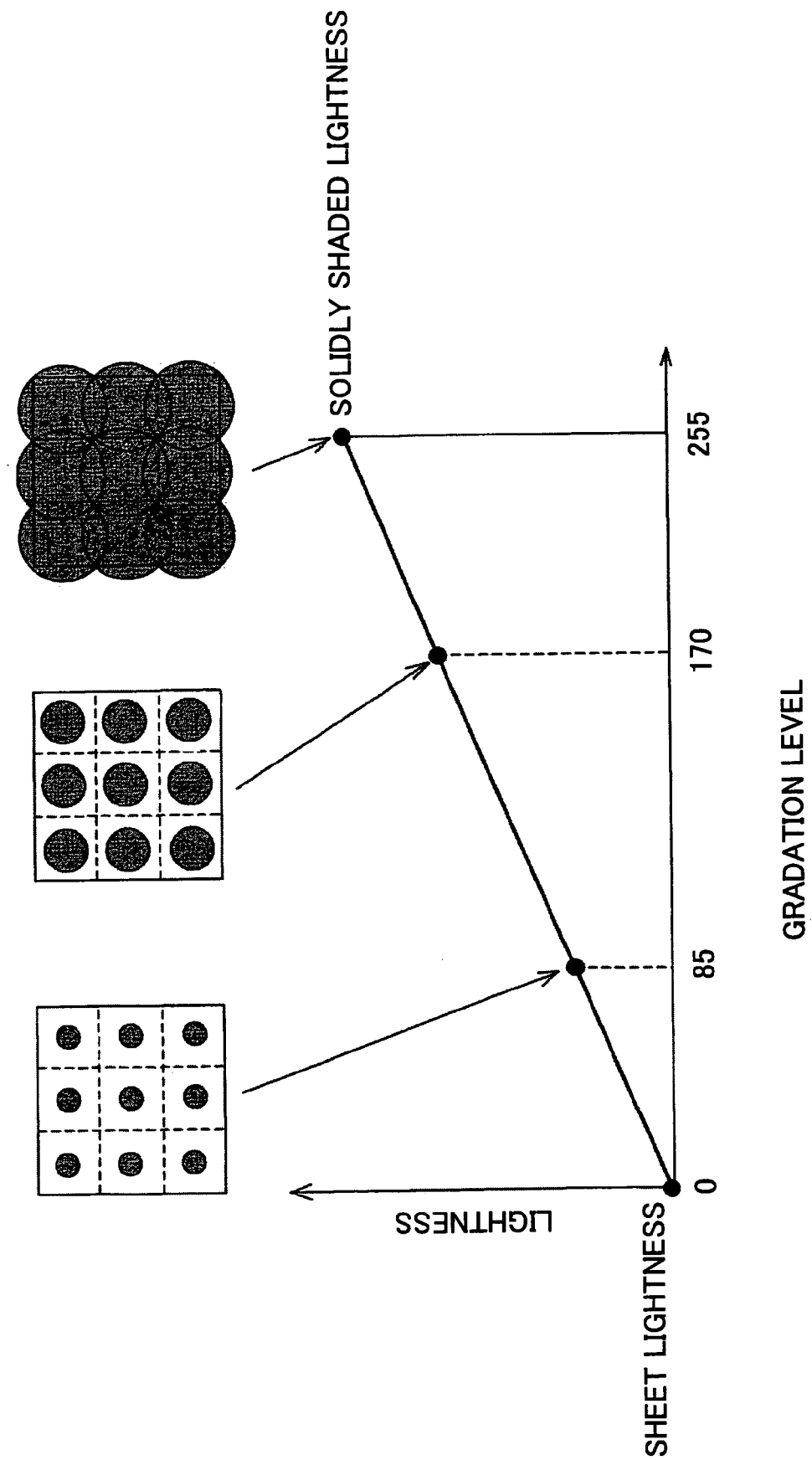

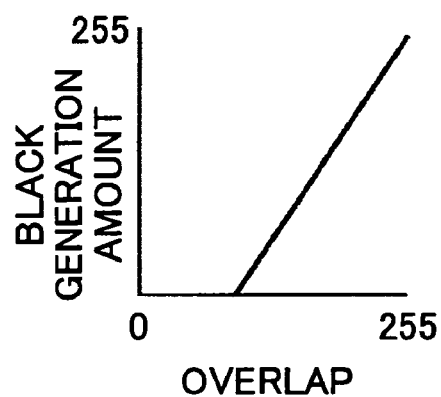
FIG.20A
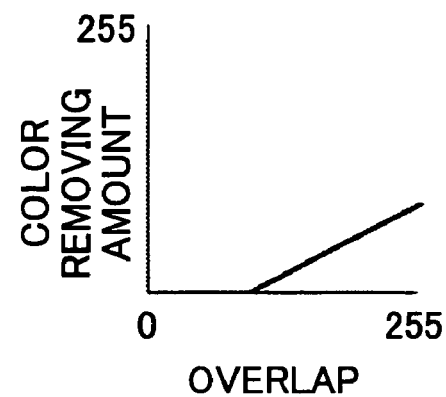
FIG.20B
FIG.21
| BLACK \ COLOR | SMALL | MIDDLE | LARGE |
|---|---|---|---|
| SMALL | A | B | C |
| MIDDLE | D | E | F |
| LARGE | G | H | I |

INK DROP COMBINATION (Cy/Bk)

IMAGE PROCESSING METHOD, PROGRAM, IMAGE PROCESSING DEVICE, IMAGE FORMING DEVICE, AND IMAGE FORMING SYSTEM

BACKGROUND OF THE INVENTION

1. Field of the Invention

The present invention relates to an image processing method, a computer-readable program, an image processing device, an image forming device, and an image forming system.

2. Description of the Related Art

For example, an ink-jet printing device in which a droplet ejection head is used for the printing head is known as one of image forming devices including a printer, a facsimile, a copier and a multi-function peripheral. This ink-jet printing device is provided to eject the ink from the printing head to a sheet as the printing liquid, so that image formation is carried out on the sheet. The sheet in this case is not limited to paper, but it is meant to include an OHP (overhead projector) sheet, a printing medium, a recording medium, a recording sheet, a printing sheet, etc.

In order to allow the ink-jet printing device to spread from the personal use to the office use, it is necessary to resolve the two problems which follow.

One problem is the printing speed. In a commonly used ink-jet printing device (except for the special industrial type), the printing head which is smaller in size than the recording sheet is used to perform printing by scanning the sheet surface repeatedly and ejecting ink drops thereto. This is the line printing method. When compared with an image forming device of electrophotographic printing type which performs printing on a sheet (page) basis, the line printing method is disadvantageous in respect of the printing speed.

In order to obviate the problem of the printing speed, some improved methods are adopted which include the increase of the scanning speed by raising the cycle of ejection of ink drops, the reduction of the number of times of the scanning by enlargement of the printing head size or by the bidirectional printing, and the shortest scan control which performs scanning only to the areas in which the image data are printed. With such improved methods, the printing speed that is higher than that of the electrophotographic printing method may be realized in the case of printing of a small or middle number of sheets.

The other problem is related to the cost, and the formation of an image on plain paper by the ink-jet printing device with lost cost is usually difficult. If a special sheet for ink-jet printing is used, high quality image reproduction may be attained. The image quality of the ink jet printed image created by the ink-jet printing device of the personal use in recent years has come to be increasingly close to that of a photograph.

However, such special sheets are generally expensive, and the introduction of the special sheets into companies or offices in which severe cost control is required is difficult. In addition, high-level image quality is not required for the images outputted for the office use, and if the high-level image quality can be attained only with the special sheets, the ink jet printing is disadvantageous in respect of the cost.

In order to allow the image formation on plain paper, it is necessary to improve the composition of the ink. For example, development of dye ink with low permeation, use of auxiliary fixing agent, development of pigment ink, etc. have been tried. The newest model of the ink-jet printing device has come to perform the image formation on the plain paper commonly used in offices or the sheets commonly used as copy papers with good image quality which is equivalent to that of the image forming device of electrophotographic printing type.

The ink-jet printing device is becoming a very attractive product also in the office use by the improvement of the scanning speed and image quality. In particular, it is advantageous in respect of the cost when compared with a laser printer. And the miniaturization of the ink-jet printing device is easy and the desktop use is also progressing.

However, unlike image forming devices, such as laser printers and offset printing devices, which include the mechanism for fixing the coloring material to the sheet surface, the ink-jet printing device makes the coloring material permeate into the sheet. The ink-jet printing device has the problems or restrictions accompanied with the permeation process.

One of the problems is that the ink of one color previously adhered to the sheet colors more conspicuously than the ink of another color subsequently adhered to the same part of the paper. The ink-jet printing device for the office use makes use of the bidirectional printing in which printing is performed in each of the forward and backward motions of the printing head, in order to raise the printing speed. However, when the bidirectional printing is performed, the order of impact of ink will be reversed for the forward printing and the backward printing, and a different coloring for every scanning line of the forward printing and the backward printing may take place. As the phenomenon, the thin horizontal-stripe patterns appear on the image being originally formed. Thus, the image quality will deteriorate.

Some countermeasures against the color difference (bidirectional color difference) accompanied with such bidirectional printing have been proposed. One of them is to use a head unit having a symmetrical arrangement in which the nozzles of the respective colors are arranged to be symmetrical to the main scanning direction. For example, see Japanese Laid-Open Patent Application No. 11-320926 and Japanese Laid-Open Patent Application No. 07-242036.

With the head unit of the symmetrical arrangement, the two nozzles in the head unit are shifted along the scanning line by one pitch of the resolution and the images formed sequentially in order of the forward printing and the backward printing are arranged per every 1-dot line. Theoretically, no color difference is produced by the coloring itself.

However, some problems remain unresolved in realizing the head unit of the symmetrical arrangement, and it is very difficult to realize the arrangement in which the nozzles of the respective colors are arranged to be completely symmetrical.

For example, if the head composition is provided to use separate units for the respective colors, the four color heads of cyan (C), magenta (M), yellow (Y), and black (K) will require seven or eight units. The cost in such a case will be increased more than that in the case of the head unit of the asymmetrical arrangement.

Especially, in the case of the printing head of the type in which the diaphragm which constitutes a part of pressurizing liquid chamber deforms according to displacement of a piezoelectric element to eject ink by the pressure by the volume change, the miniaturization of the head unit itself is difficult. With the increase in the number of head units, this will result in the enlargement of the head module and the enlargement of the carriage, i.e., the enlargement of the ink-jet printing device.

Moreover, when assembling the respective units, care must be taken to the assembling accuracy of not only the units of different colors but also the units of the same color. This causes the difficulty of manufacture to become high.

In the case of the printing head of the type in which sudden heating of the ink contained in the pressurizing liquid chamber is performed, so that the ink is ejected by using the volume change by the film boiling, it is easy to manufacture the printing head of symmetrical composition as an integral unit by applying the photolithographic printing method. And it is possible to reduce the difficulty of assembling. However, the recovery mechanism for keeping the state of the nozzle surface constant must be provided commonly to the respective colors, and a color mixture on the nozzle surface is likely to take place.

In recent years, in order to raise the image quality of black characters, the use of inks of different characteristics, like dye inks used as color inks and a pigment ink used as a black ink, is increasing. And not only the color mixture due to the recovery mechanism deteriorates the image quality, but also nozzle clogging due to the solidified sub-products etc. leads to a possibility of lowering the ink ejection stability.

To overcome the problem, the head unit of the asymmetrical arrangement in which the nozzle for ejecting the black ink is separated from the other nozzles of the symmetrical arrangement has been proposed as disclosed in Japanese Laid-Open Patent Applications No. 2005-001336 and No. 2005-001337.

However, the separation of the black nozzle from the other color ink nozzles, as disclosed in Japanese Laid-Open Patent Applications No. 2005-001336 and No. 2005-001337 causes the problem of the bidirectional color difference between the black ink and the other color inks to occur again, which must have been eliminated by the symmetrical arrangement.

SUMMARY OF THE INVENTION

According to one aspect of the invention, there is provided an improved image processing method in which the above-described problems are eliminated.

According to one aspect of the invention, there is provided an image processing method which is adapted to reduce the bidirectional color difference due to the use of the head unit of the asymmetrical arrangement in which the black ink nozzle is separated from the other nozzles of the symmetrical arrangement.

According to one aspect of the invention, there is provided an image processing device which is adapted to reduce the bidirectional color difference due to the use of the head of the asymmetrical arrangement in which the black ink nozzle is separated.

In an embodiment of the invention which solves or reduces one or more of the above-mentioned problems, there is provided an image processing method which performs processing to generate image data based on input data and output the image data to an image forming device, the image forming device including a printing head in which first nozzles for ejecting color ink drops are arranged in a symmetrical formation to forward and backward scanning directions and second nozzles for ejecting black or gray ink drops are arranged in an unsymmetrical formation with respect to the first nozzles for ejecting color ink drops, and adapted to perform a uni-directional printing or a bidirectional printing with the printing head, the image processing method comprising the steps of: performing a black generation processing to the input data; and delaying, when performing the black generation processing, a black-generation start level for the bidirectional printing to a shadow-side gradation level from a black-generation start level for the uni-directional printing.

In an embodiment of the invention which solves or reduces one or more of the above-mentioned problems, there is provided an image processing device which performs processing to generate image data based on input data and output the image data to an image forming device, the image forming device including a printing head in which first nozzles for ejecting color ink drops are arranged in a symmetrical formation to forward and backward scanning directions and second nozzles for ejecting black or gray ink drops are arranged in an unsymmetrical formation with respect to the first nozzles, and the image forming device being adapted to perform a uni-directional printing or a bidirectional printing with the printing head, and adapted to use multi-level gradation expression by changing ink drop size or using inks with a same hue and different optical densities, wherein the image processing device comprises a control unit configured to perform a black generation processing to the input data, and to delay, when performing the black generation processing, a black-generation start level for the bidirectional printing to a shadow-side gradation level from a black-generation start level for the uni-directional printing.

In an embodiment of the invention which solves or reduces one or more of the above-mentioned problems, there is provided an image forming device which comprises: a printing head in which first nozzles for ejecting color ink drops are arranged in a symmetrical formation to forward and backward scanning directions and second nozzles for ejecting black or gray ink drops are arranged in an unsymmetrical formation with respect to the first nozzles, wherein the image forming device is adapted to perform a uni-directional printing or a bidirectional printing with the printing head, and adapted to use multi-level gradation expression by changing ink drop size or using inks with a same hue and different optical densities, wherein the image forming device further comprises a control unit configured to perform a black generation processing to input data, and to delay, when performing the black generation processing, a black-generation start level for the bidirectional printing to a shadow-side gradation level from a black-generation start level for the uni-directional printing.

According to embodiments of the image processing method and device of the invention, it is possible to reduce the bidirectional color difference caused by the use of the head unit of the asymmetrical arrangement, and it is possible to improve the image quality of the outputted image.

BRIEF DESCRIPTION OF THE DRAWINGS

Other objects, features and advantages of the present invention will be apparent from the following detailed description when reading in conjunction with the accompanied with drawings.

FIG. 3 is a perspective view of a head unit of the ink-jet printing device in FIG. 1.

FIG. 4 is a diagram for explaining image formation operation of the head unit in FIG. 3.

FIG. 17 is a diagram for explaining the gradation value reproduction range by the dot of each size in multi-level gradation expression in dot size modulation.

FIG. 20A and FIG. 20B are diagrams for explaining an example of the actual BG/UCR processing.

FIG. 21 is a diagram showing the combinations of the dot sizes of K ink and color ink.

DETAILED DESCRIPTION OF PREFERRED EMBODIMENTS

A description will be given of an embodiment of the invention with reference to the accompanied with drawings.

Figure 1:
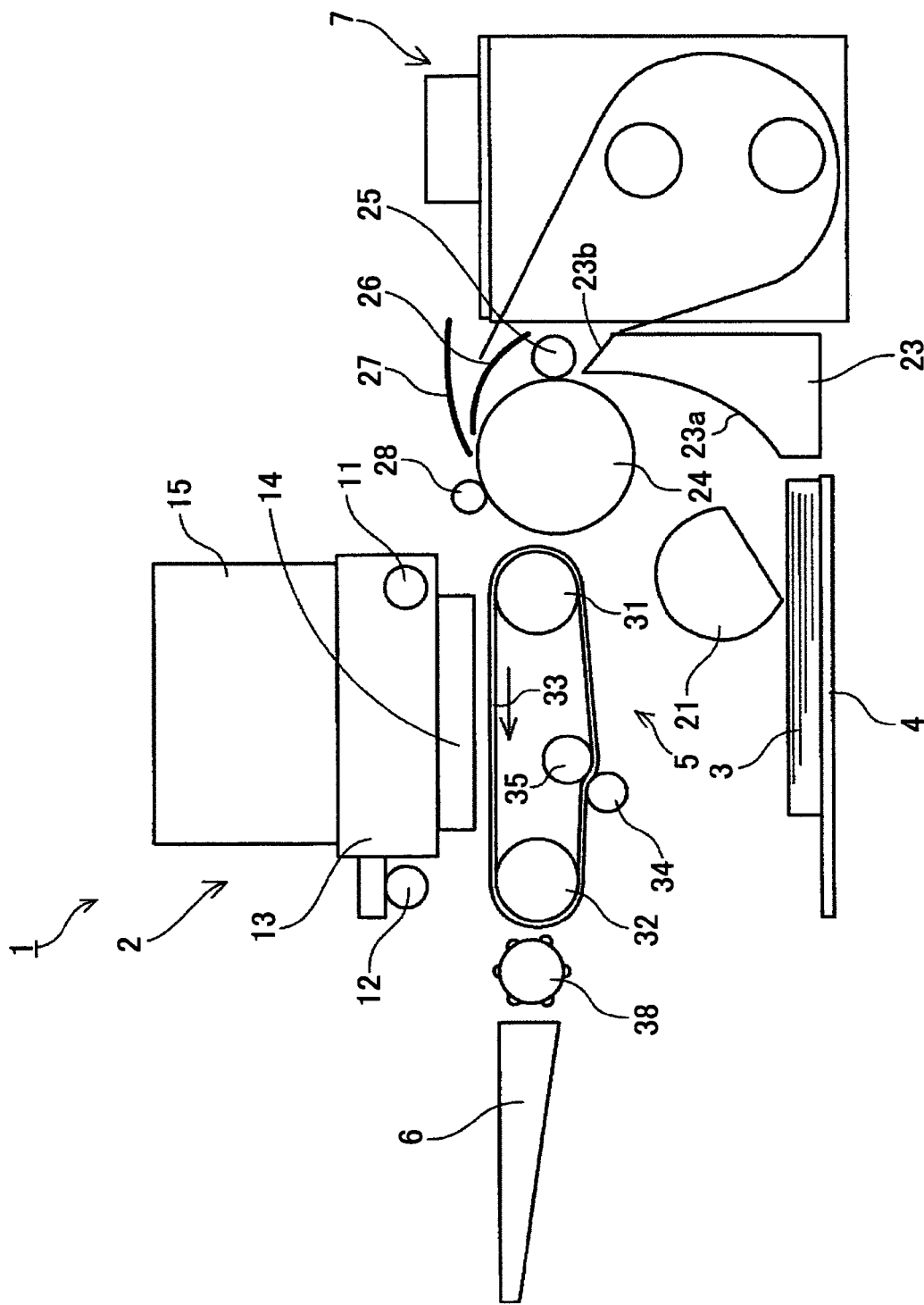
FIG. 1 is a diagram showing the composition of a mechanism part of an ink-jet printing device.
Figure 2:
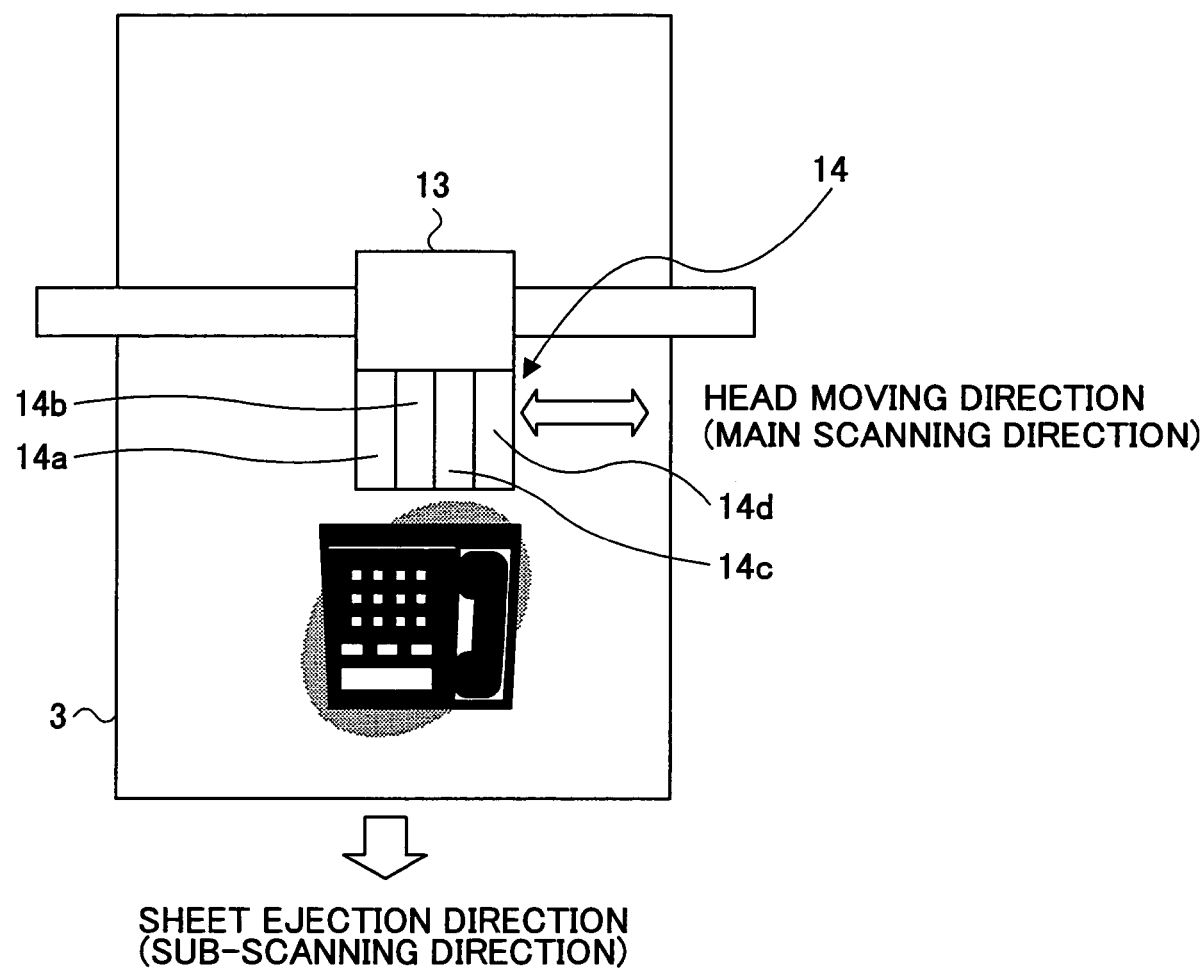
FIG. 2 is a plan view of the mechanism part of the ink-jet printing device in FIG. 1.

An ink-jet printing device which is an image forming device in an embodiment of the invention will be explained. FIG. 1 shows the composition of a mechanism part of the ink-jet printing device. FIG. 2 is a plan view of the mechanism part of the ink-jet printing device in FIG. 1. FIG. 3 is a perspective view of a head unit of the ink-jet printing device in FIG. 1.

As shown in FIG. 1, this ink-jet printing device has an image formation part 2 provided inside an ink-jet printing device body 1. On the bottom side of the device body 1, a sheet tray 4 which is adapted for containing a number of recording mediums (sheets) 3 is provided. A sheet 3 is delivered from the sheet tray 4 to the image formation part 2 by a sheet transport mechanism 5. After a desired image is printed on the sheet 3 by the image formation part 2 while the sheet 3 is transported by the sheet transport mechanism 5, the sheet 3 is delivered to a paper output tray 6 which is provided on the side of the device body 1.

Moreover, the ink-jet printing device is provided with a double-sided printing unit 7. The double-sided printing unit 7 is detachably mounted to the device body 1 and performs a double-sided printing of a sheet 3. After a front surface printing of the sheet 3 is performed, the sheet 3 is received by the double-sided printing unit 7 and it is reversed to set the back surface of the sheet as being the printable surface. The reversed sheet 3 is delivered to the sheet transport mechanism 5 again. After a back surface printing of the sheet 3 is performed, the sheet 3 is delivered to the paper output tray 6.

In the image formation part 2, a carriage 13 is slidably-held on a pair of guide shafts 11 and 12. The carriage 13 is moved by a main-scan motor (not illustrated) in a main scanning direction which is perpendicular to the sheet transport direction. A printing head 14 is mounted on the carriage 13. The printing head 14 is constituted by four heads 14a-14d. Each of the four heads 14a-14d i is constituted by a droplet ejection head on which a plurality of nozzle holes 14n (see FIG. 3) for ejecting an ink droplet are arranged.

An ink cartridge 15 is detachably mounted to the printing head 14. The ink cartridge 15 is provided to supply ink to the printing head 14. Alternatively, instead of the ink cartridge 15, a subtank may be mounted to the printing head 14, so that ink from a main tank can be supplied or supplemented to the subtank.

As an ink jet head which constitutes the printing head 14, any of various heads may be used, which include, as an energy generation means for ejecting the ink, a piezoelectric drive unit, such as a piezoelectric element, a thermal drive unit utilizing the phase change by liquid film boiling using an electric thermal conversion element, such as an exothermic resistor, an electrostatic drive unit utilizing an electrostatic force, and a shape memory alloy drive unit utilizing the metallic phase change by a temperature change.

The sheet 3 is separated from the sheets of the sheet tray 3 one by one using a separating pad (not illustrated) and a feeding roller 21, and the sheet 3 is fed to the sheet transport mechanism 5 in the device body 1.

The sheet transport mechanism 5 includes a transport guide part 23, a transport roller 24, a pressurizing roller 25, a guide member 26, a guide member 27, and a pushing roller 27. The transport guide part 23 is provided to guide the sheet 3 from the sheet tray 4 upward along a guide surface 23a and guides the sheet 3 from the double-sided printing unit 7 upward along a guide surface 23b. The transport roller 24 is provided to transport the sheet 3. The pressurizing roller 25 is provided to depress the sheet 3 to the transport roller 24. The guide member 26 is provided to guide the sheet 3 to the transport roller 24 side. The guide member 27 is provided to guide the sheet 3, which is returned at the time of double-side printing, to the double-sided printing unit 7. The pushing roller 28 is provided to push the sheet 3 fed from the transport roller 24.

The sheet transport mechanism 5 further includes a transport belt 33 which is wound between a driving roller 31 and a driven roller 32 to transport the sheet 3 while maintaining the flat condition of the sheet 3 to the printing head 14, a charging roller 34 which is provided for charging the transport belt 33 electrostatically, a guide roller 35 which is provided to counter the charging roller 34, a guide member (not illustrated) which is provided to guide the transport belt 33 in the level which counters the image formation part 2, and a cleaning roller (not illustrated) of a porous material which is a cleaning means for removing the recording liquid (ink) adhering to the transport belt 33.

The transport belt 33 is an endless-type belt, and it is wound between the driving roller 31 and the driven roller (voltage roller) 32. The transport belt 33 is provided so that it is rotated in the direction (sheet ejection direction) indicated by the arrow in FIG. 1

The charging roller 34 is arranged to contact the surface of the transport belt 33, and it is rotated to follow the rotation of the transport belt 33. A high voltage is supplied to the charging roller 34 in a predetermined pattern from the high voltage power supply (not illustrated).

An ejection roller 38 is arranged at a downstream level of the sheet transport mechanism 5, and the ejection roller 38 delivers the sheet 3 on which the image is printed, to the paper output tray 6.

In the above-described image forming device, the transport belt 33 is rotated in the direction indicated by the arrow in FIG. 1, and the transport belt 33 is charged positively when it contacts the charging roller 34 to which the high voltage is supplied. In this case, the charging polarity may be altered in a predetermined charging pattern by changing the polarity of the electric charge of the charging roller 34 at a predetermined interval.

When the sheet 3 is delivered to the transport belt 33 charged with the high voltage, the inside of the sheet 3 is set in the polarization state. The electric charge of the reversed polarity to the electric charge on the transport belt 33 is created on the surface of the sheet 3 in contact with the transport belt 33, and the sheet 3 is electrostatically attracted by the transport belt 33.

Thus, curvature and unevenness are eliminated from the sheet 3 by the electrostatic force of the transport belt 33 to the sheet 3, and the flatness of the sheet surface is maintained.

When the transport belt 33 is rotated to transport the sheet 3 on the transport belt 33 with the scanning movement of the carriage 13 being performed in a uni-directional or bidirectional manner, the printing head 14 is driven according to an image signal. As shown in FIGS. 4(a) and (b), the ink droplet 14i is ejected from the printing head 14, so that the ink droplet reaches the sheet 3 in the stop condition to form the dot Di. One line of dots is printed on the sheet 3 by the printing head 14, and, after the sheet 3 is transported by a given transport pitch, the following line of dots will be printed on the sheet 3.

When a print end signal or a signal indicating arrival at the rear end of the sheet 3 is received, the printing operation is terminated. FIG. 4(b) is an enlarged view of the dot Di formed on the sheet 3 shown in FIG. 4(a). The sheet 3 on which the image is printed in this manner is delivered to the paper output tray 6 by the ejection roller 38.

Next, the color difference (bidirectional color difference) when the bidirectional printing is performed will be explained with reference to FIG. 5 through FIG. 8.

Figure 5:
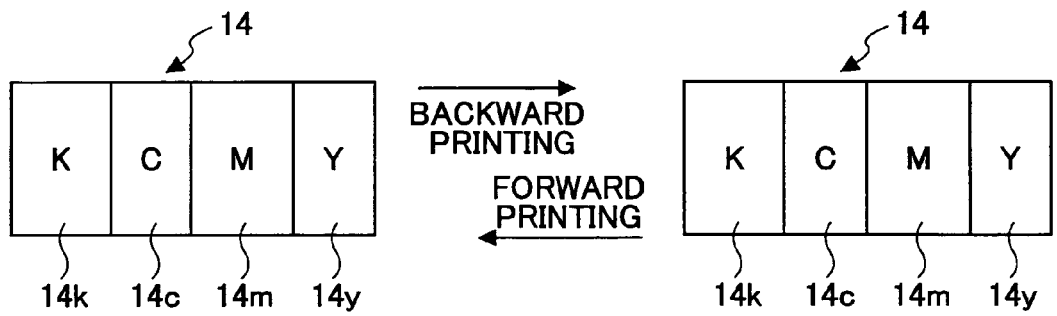
FIG. 5 is a diagram for explaining occurrence of bidirectional color difference.

As shown in FIG. 5, it is assumed that printing heads 14k, 14c, 14m, and 14y are arranged in order of K, C, M, and Y in the forward printing direction parallel to the main scanning line, to constitute the head unit. However, it is not necessarily limited to this arrangement order and the number of colors, and the head unit may be modified according to the ink characteristics and the head design.

The bidirectional printing is carried out by performing printing in both the forward and backward directions of the carriage movement, and it can reduce the number of times of the carriage movement needed for printing per sheet, and aim at shortening of the printing.

However, a gap of the printing level accompanied with the bidirectional printing operation is likely to occur and a color difference accompanied with the order of color overlaying which deteriorates the image quality is likely to occur. For these reasons, the bidirectional printing method is utilized for the printing mode in which priority is mainly given to the printing speed over the image quality.

In the case of the head arrangement in FIG. 5, by the forward printing, ink drops are ejected at the same level in order of K−>C−>M−>Y, and by the backward printing, ink drops are ejected in the reverse order of Y−>M−>C−>K, so that the bidirectional printing is performed.

Because of the ink-jet coloring material fixing characteristics, when the ink drops of different colors are ejected at the same level on the sheet, the color of the ink drop which previously reached the sheet surface becomes dominant.

Figure 6:
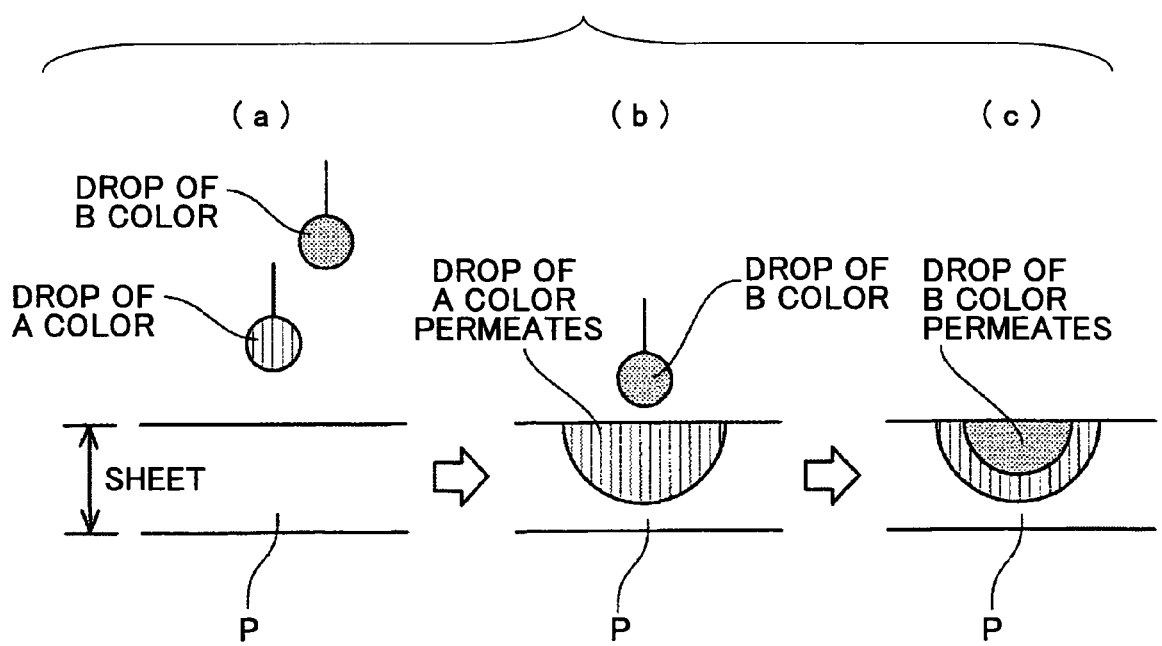
FIG. 6 is a diagram for explaining permeation of dye ink in the sheet.

FIG. 6 is a diagram for explaining the permeation of dye ink in the sheet when ejecting the dye ink at the same level on the sheet.

As shown in FIG. 6(a), suppose that the drop of A color is ejected to the sheet P, and the drop of B color is ejected to the sheet P in this order. As shown in FIG. 6(b), the previously ejected drop of A color permeates the sheet P, and the drop of B color is subsequently ejected to the sheet P. As shown in FIG. 6(c), the drop of B color will only permeate in the permeation range of the drop of A color, and the previously ejected drop of A color will spread in the range larger than the subsequently ejected drop of B color. And a color difference is produced in the fixing range of coloring material. For this reason, the previously ejected ink drop in the case of secondary colors (C+M, M+Y, etc.) serves as a more dominant color component.

Figure 7:
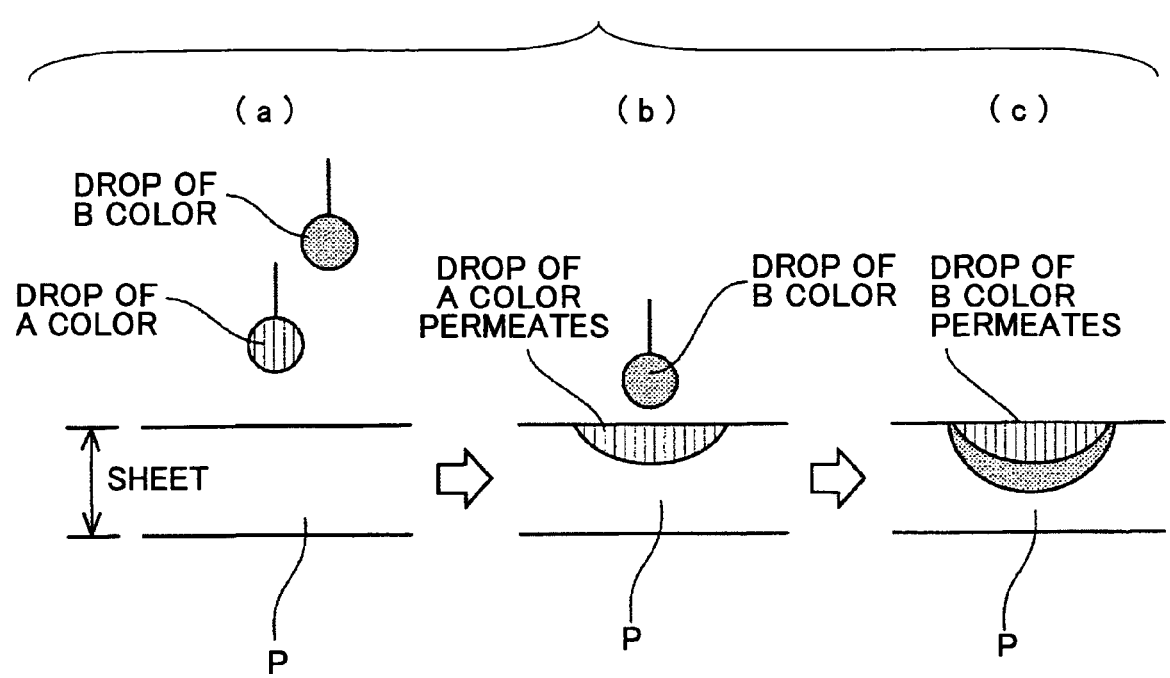
FIG. 7 is a diagram for explaining permeation of pigment ink in the sheet.

FIG. 7 is a diagram for explaining the permeation of pigment ink in the sheet when ejecting the pigment ink at the same level on the sheet.

As shown in FIG. 7(a), suppose that the drop of A color is ejected to the sheet P, and the drop of B color is ejected to the sheet P in this order. As shown in FIG. 7(b), the previously ejected drop of A color permeates the sheet P, and the drop of B color is subsequently ejected to the sheet P. As shown in FIG. 7(c), the drop of B color escapes from the permeation range of the drop of A color and sinks in the inside of the sheet P to permeate the sheet P in the deeper range. The coloring material contained in the previously ejected ink stays only in the sheet surface, and the coloring material contained in the subsequently ejected ink sinks in the inside of the sheet. As a result, the characteristics of the coloring material of the previously ejected ink near the sheet surface become conspicuous and serve as a dominant color component.

Therefore, in the case of the above-mentioned head composition shown in FIG. 5, the expected sequence of dominant color intensity at the time of forward printing is K>C>M>Y since ink drops are ejected in order of K−>C−>M−>Y, and the expected sequence of dominant color intensity at the time of backward printing is Y>M>C>K since ink drops are ejected in the reverse order of Y−>M−>C−>K.

Figure 8:
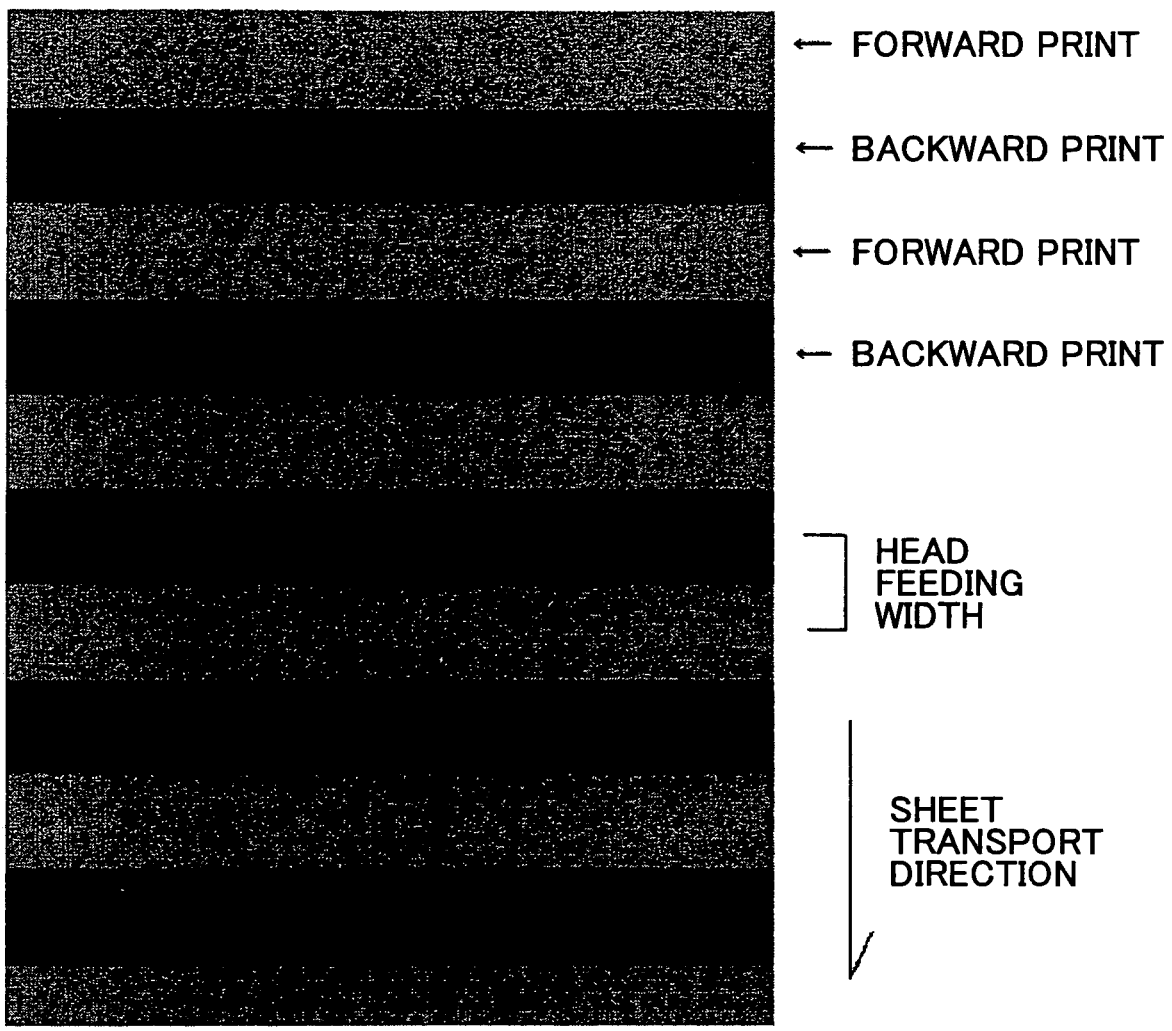
FIG. 8 is a diagram showing an example of the recorded image in which the bidirectional color difference occurs.

When the bidirectional printing is used in order to raise the printing speed, it is necessary to take into consideration the tone change of the secondary colors and the third colors (C+M+Y etc.) resulting from these characteristics. Especially when the sheet is transported greatly for each of the forward and backward scanning movements, there is a possibility that changes of color tone may serve as horizontal stripes and they may appear on the outputted image as shown in FIG. 8.

Figure 9:
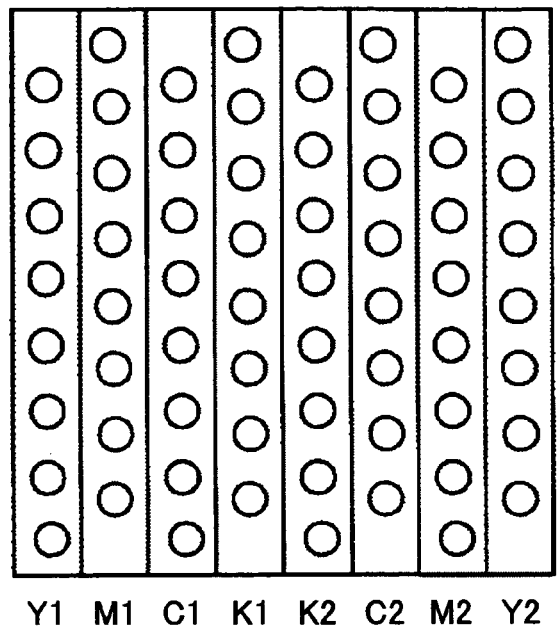
FIG. 9 is a diagram showing the composition of the head unit of the symmetrical arrangement.
Figure 10:
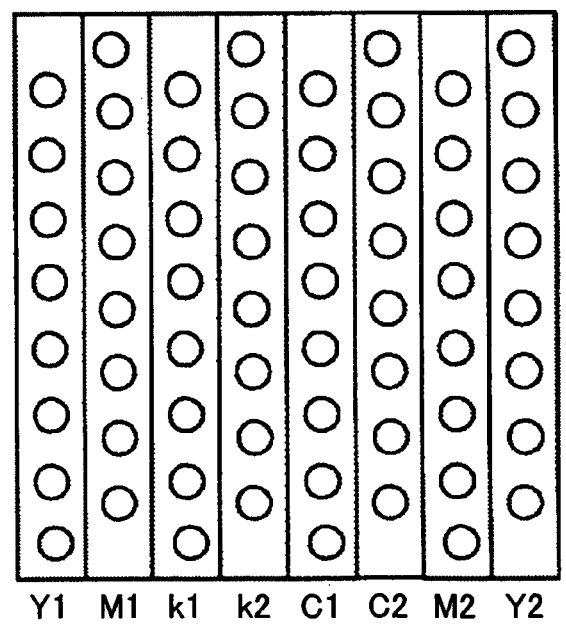
FIG. 10 is a diagram showing the composition of the head unit of the asymmetrical arrangement.

Such bidirectional color difference can be eliminated by using the head unit of the symmetrical arrangement as shown in FIG. 9 or the head unit of the asymmetrical arrangement as shown in FIG. 10.

That is, in the case of the head unit of the symmetrical arrangement shown in FIG. 9, the head composition may be configured so that the plurality of rows of nozzle sequences in which the plurality of nozzles are arrayed in the sub-scanning direction are arranged in the main scanning direction, and the nozzles for ejecting the ink of the same color are arrayed in two or more rows, and one or more rows of the nozzles for ejecting the ink of different colors are interposed between the nozzles for ejecting the ink of the same color.

Specifically, in the example of FIG. 9, the head composition is provided so that the nozzle sequences are arranged in order of nozzle sequence Y1 for ejecting the Y ink, nozzle sequence M1 for ejecting the M ink, nozzle sequence C1 for ejecting the C ink, nozzle sequence K1 for ejecting the K ink, nozzle sequence K2 for ejecting the K ink, nozzle sequence C2 for ejecting the C ink, nozzle sequence M2 for ejecting the M ink, and nozzle sequence Y1 for ejecting the Y ink.

Although not illustrated, another composition of the printing head of the symmetrical arrangement may be provided, so that the plural nozzle sequences, each including two or more nozzles arrayed in the sub-scanning direction, are arranged in the main scanning direction, the nozzles for ejecting the ink of the same color are arrayed in two or more rows, and one or more rows of the nozzles for ejecting the ink of different colors are interposed between the nozzles for ejecting the ink of the same color, and the nozzles for ejecting the ink of the same color are arranged symmetrically about the axis which is perpendicular to the main scanning direction.

Thus, the bidirectional color difference is eliminated by arranging two or more rows of nozzle sequences for ejecting the ink of the same color, and interposing one or more rows of nozzle sequences for ejecting another color ink between the former nozzle sequences.

As shown in FIG. 9, by arranging the nozzle sequences for ejecting the M, C, and K ink between the nozzle sequences for ejecting the Y ink, it is possible to overlay, regardless of whether it is the forward printing or the backward printing, the ink drops in order of C–>Y, or it is possible to overlay the ink drops in order of Y–>C. In addition, regardless of whether it is the forward printing or the backward printing, it is possible to overlay the ink drops in order of M–>Y or in order of Y–>M. Thereby, the bidirectional printing can be carried out while expanding the color reproduction region and it is possible to perform the color printing with a wide color reproduction region at high speed.

In the case of the head unit of the asymmetrical arrangement shown in FIG. 10, the nozzle sequences K1 and K2 for ejecting the K ink are not symmetrical to the other nozzle sequences for ejecting the color ink. Specifically, in the example of FIG. 10, the head composition is provided so that the nozzle sequences are arranged in order of nozzle sequence Y1 for ejecting the Y ink, nozzle sequence M1 for ejecting the M ink, nozzle sequence K1 for ejecting the K ink, nozzle sequence K2 for ejecting the K ink, nozzle sequence C1 for ejecting the C ink, nozzle sequence C2 for ejecting the C ink, nozzle sequence M2 for ejecting the M ink, and nozzle sequence Y1 for ejecting the Y ink.

In this example, when using Y, M and K, or using Y, M and C, the ink ejection order becomes the same in the forward and the backward printing, and bidirectional color difference does not occur. However, the symmetrical arrangement is not applied to the combination of K and C. When using K and C, in the forward printing, the K ink reaches the sheet previously and serves as a dominant color. Conversely, in the backward printing, the C ink reaches the sheet previously and serves as a dominant color. When the K ink is mixed with the C ink and the secondary color is created in combination with the C ink, it becomes a bidirectional color difference as shown in FIG. 8. And it will appear on the outputted image.

Thus, in the asymmetrical arrangement, K and C are provided separately from the symmetrical composition. This is because no ink-jet printing device-oriented processing is performed, and the coloring material sediments inside the sheet and the plain paper generally used in offices is the sheet out of which optical density hardly comes. As this measure, development of low pervious ink and development of pigment ink are furthered from the field of ink prescription. In order to express especially the black distinctly, most is applied to K ink. On the other hand, to the remaining color ink, the prescription (high pervious ink and dye ink) for securing the image quality on the sheet chiefly is mainly applied. For this reason, the color nozzle is separated from the K nozzle so that the ink from which characteristics differ via the recovery mechanism in which the condition of the nozzle side is prepared may not be mixed.

In the head composition of FIG. 10, the C ink is excluded for the combination, and the case of another color ink may also be considered.

However, even if it carries out with low permeation ink or pigment ink, it is difficult to obtain optical density usually sufficient in the paper, and in fact, it is carrying out the overprint of the ink of CMY in addition to K, and the system with which shortage of optical density is compensated is adopted well. In such a case, the bidirectional color difference resulting from K and C having separated from the symmetrical arrangement will occur.

Next, the composition of the control unit of the image forming device in this embodiment will be explained with reference to FIG. 11.

Figure 11:
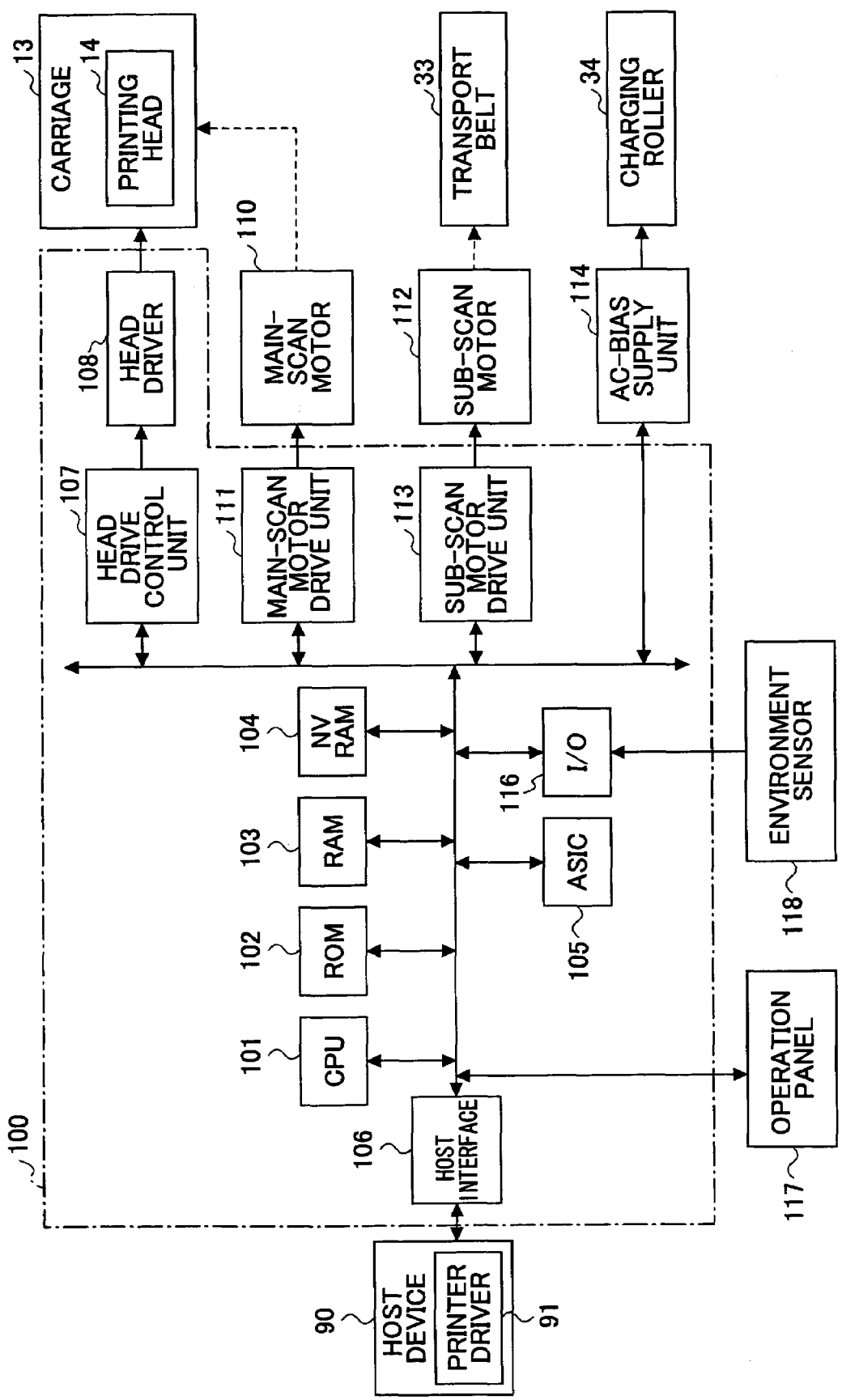
FIG. 11 is a block diagram showing the composition of a control unit of the ink-jet printing device in FIG. 1.

As shown in FIG. 11, the control unit 100 is provided with the following. The CPU 101 controls the whole image forming device. The ROM 102 stores the program executed by the CPU 101 and other fixed data. The RAM 103 stores image data etc. temporarily. The nonvolatile memory (NVRAM) 104 is provided for holding data also while the power supply of the device is turned off. The ASIC 105 is provided to perform image processing to control various signal conditioning, rearrangement, etc. and perform processing of the input/output signal for controlling the whole device. The interface 106 for this control unit 100 to perform the data by the side of hosts 90, such as a personal computer (PC) containing the image processing device concerning the invention, and transmission and reception of a signal. The head drive control unit 107 and the head driver 108 for carrying out drive control of the printing head 14. The main-scan motor drive unit 111 is provided for driving the main-scan motor 110. The I/O 116 is provided for inputting the detection signal from the environment sensor 118 which detects the environmental temperature and/or environmental moisture and the various sensors which are not illustrated etc. The sub-scan motor drive unit 113 is provided for driving the sub-scan motor 112. The operation panel 117 for performing the input and display of information required for this device is connected to this control unit 100.

The control unit 100 performs switching ON/OFF of the high voltage circuit (AC bias supply unit) 114 which supplies the high voltage to the charging roller 34, and performs switching control of the output polarity.

The control unit 100 receives the print data containing the image data from the host device 90, such as imaging devices, such as image readers, such as data processors, such as a personal computer, and an image scanner, and a digital camera, by the interface 106 via a cable or a network.

The printer driver 91 on the side of the host device 90 performs the generation of the print data and the output of the print data to the control unit 100.

The CPU 101 reads and analyzes the print data in the receive buffer contained in the interface 106, and causes the ASIC 105 to perform image data re-arrangement processing, and transmits the image data to the head drive control unit 107.

The conversion to the bit map data of the print data for carrying out a generating image develops image data to bit map data with printer driver 91 by the side of the host device 90 and he is trying to transmit them to this device as mentioned above. For example, it may be provided so that the ROM 102 stores the font data.

When the image data (dot pattern data) equivalent to one line of the printing head 14 are received, the head drive control unit 107 sends the dot pattern data for one line to the head driver 108 as the serial data in synchronization with a clock signal, and sends a latch signal to the head driver 108 at a predetermined timing.

The head drive control unit 107 comprises a driving waveform generating circuit which comprises the ROM in which the pattern data of the driving waveform (driving signal) is stored (which may be constituted by the ROM 102), the waveform generating circuit containing the D-A converter which carries out D/A conversion of the data of the driving waveform read from the ROM, and the amplifier.

The shift register into which the head driver 108 inputs the serial data which is the clock signal and image data from head drive control unit 107, the latch circuit which latches the resist value of a shift register with the latch signal from head drive control unit 107, the level conversion circuit which carries out the level variation of the output value of a latch circuit (level shifter), the necessary driving waveform contained in a driving waveform by controlling ON and OFF of an analog switch array by this level shifter including the analog switch array (switching means) by which ON and OFF is controlled is alternatively supplied to the drive unit means of printing head 14, and a head is driven.

In an embodiment of the invention which solves or reduces one or more of the previously described problems of the related art, there is provided an image forming system which comprises an image processing device and an image forming device, the image processing device performing processing to generate image data based on input data and output the image data to the image forming device, the image forming device including a printing head in which first nozzles for ejecting color ink drops are arranged in a symmetrical formation to forward and backward scanning directions and second nozzles for ejecting black or gray ink drops are arranged in an unsymmetrical formation with respect to the first nozzles, and the image forming device being adapted to perform a uni-directional printing or a bidirectional printing with the printing head and adapted to use multi-level gradation expression by changing ink drop size or using inks with a same hue and different optical densities, wherein the image processing device comprises a control unit configured to perform a black generation processing to the input data, and to delay, when performing the black generation processing, a black-generation start level for the bidirectional printing to a shadow-side gradation level from a black-generation start level for the uni-directional printing.

In an embodiment of the invention which solves or reduces one or more of the previously described problems of the related art, there is provided an image forming system which comprises an image forming device and an image processing device, the image processing device performing processing to generate image data based on input data and output image data to the image forming device, and the image forming device comprising a printing head in which first nozzles for ejecting color ink drops are arranged in a symmetrical formation to forward and backward scanning directions and second nozzles for ejecting black or gray ink drops are arranged in an unsymmetrical formation with respect to the first nozzles, wherein the image forming device is adapted to perform a uni-directional printing or a bidirectional printing with the printing head and adapted to use multi-level gradation expression by changing ink drop size or using inks with a same hue and different optical densities, and wherein the image forming device further comprises a control unit configured to perform a black generation processing to input data, and to delay, when performing the black generation processing, a black-generation start level for the bidirectional printing to a shadow-side gradation level from a black-generation start level for the uni-directional printing.

Next, the composition of an image processing device in an embodiment of the invention which is provided in a personal computer (PC), which is the host device, to generate and output image data to the image forming device in order to cause the image forming device to form an image, will be explained with reference to FIG. 12 and FIG. 13.

Figure 12:
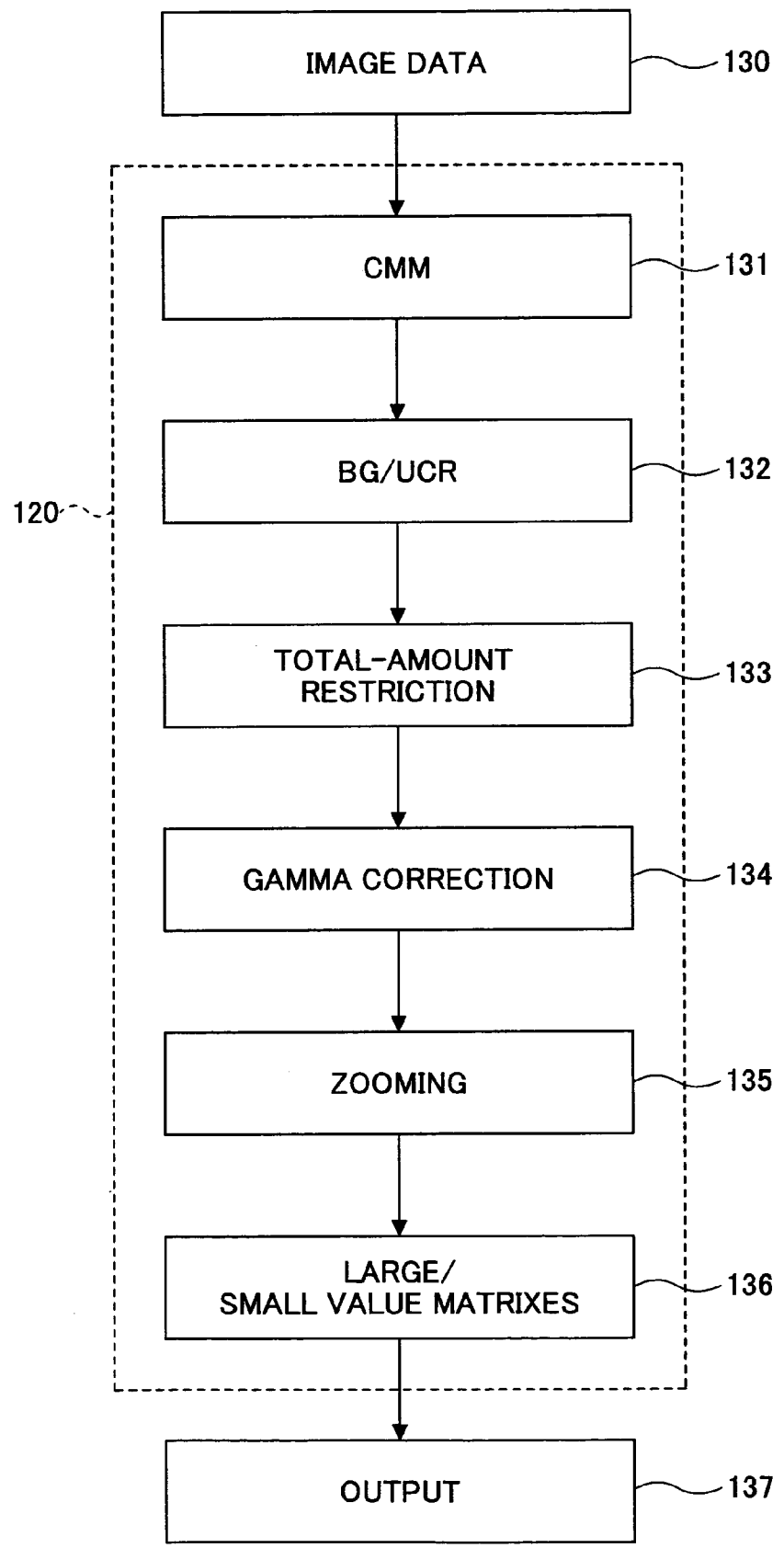
FIG. 12 is a block diagram for explaining the functional composition of a printer driver in an embodiment of the invention.

In the composition of FIG. 12, the image processing device 120 is provided in the printer driver 91 of the host device 90.

The image processing device 120 is provided with the following. The CMM (Color Management Module) processing unit 131 which performs the processing of color transform (RGB color coordinates –>CMY color system) from the color space for the display monitor to the color space for the image forming device, with respect to the image data 130 sent from the application program.

The BG/UCR (black generation/under-color removal) processing unit 132 is a black generation processing unit which performs black generation and under-color removal processing to convert the CMY values into the KCYM values including the black (K) component value.

The total-amount restriction unit 133 corrects the CMYK signal, which serves as the print control signal, according to the maximum total amount value of the printing color material which can be used by the image forming device to carry out image formation.

The gamma correction unit 134 performs input/output correction reflecting the image forming device characteristic or the user preference. The zooming unit 135 performs image expanding processing according to the resolution of the image forming device. The half tone processing unit 136 contains the large/small value matrixes which are used to transpose the image data to pattern arrangement of the dots ejected from the image forming device.

Figure 13:
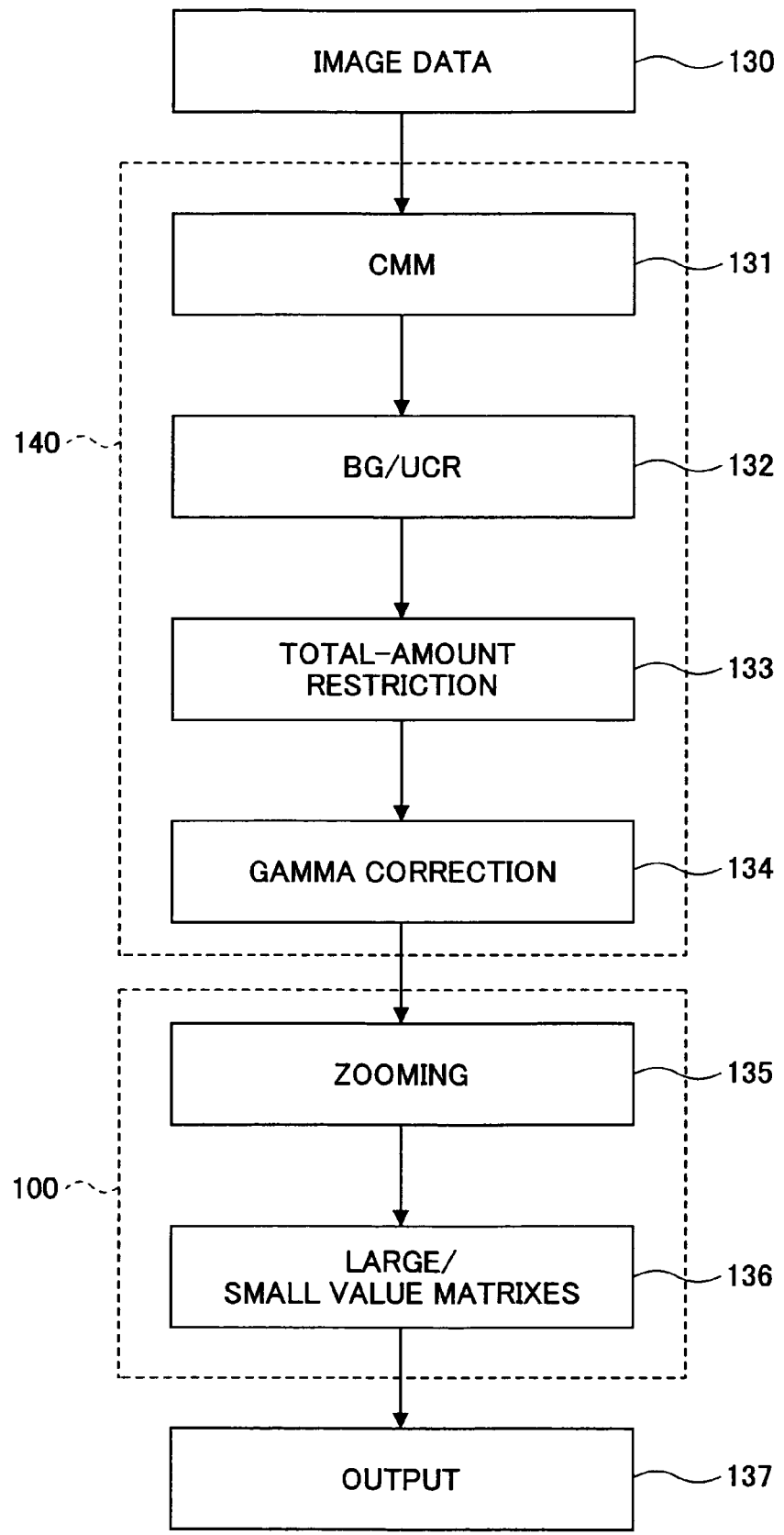
FIG. 13 is a block diagram for explaining the functional composition of a printer driver in an embodiment of the invention.

In the composition of FIG. 13, the image processing device 140 is provided in the printer driver 91 of the host device 90.

This image processing device 140 is provided with the CMM processing unit 131, the BG/UCR processing unit 132, the total-amount restriction unit 133, and the gamma correction unit 134.

In the composition of FIG. 13, some image processing functions which have not been provided in the image processing device 140 are constituted by the control unit 100 on the side of the image forming device.

As shown in FIG. 13, the control unit 100 is provided with the following. The zooming unit 135 receives the output data after the gamma correction processing is performed, and performs image expanding processing according to the resolution of the image forming device. The half tone processing unit 136 contains the large/small value matrixes which are used to transpose the image data to pattern arrangement of the dots ejected from the image forming device.

The composition of FIG. 12 is the composition of the image processing device (inexpensive machine) with which all the image processing is performed by the personal computer. The composition of FIG. 13 is the composition of the image processing device (high-speed machine) with which some image processing functions are preformed by the ASIC provided in the image forming device.

In the composition of FIG. 13, since the host device and the image forming device can share image processing, not only the time for the image processing can be shortened, but also some of the processing loads of the host device (PC) can be released. However, since use of a more highly efficient ASIC (and, in some case, a high-capacity memory) is needed, the price of the high-speed machine will be higher than that of the inexpensive machine.

Figure 14:
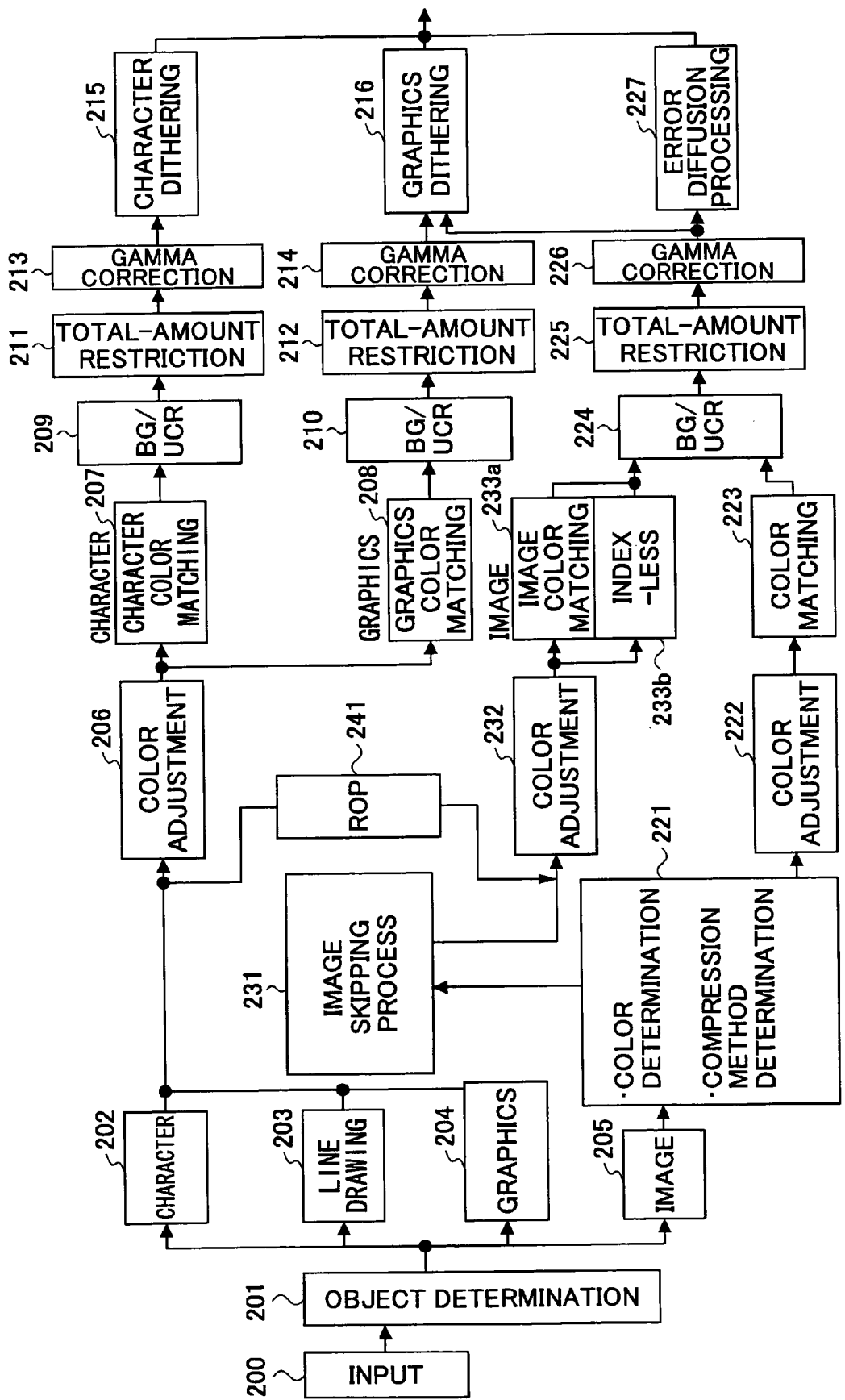
FIG. 14 is a block diagram for explaining the procedure of image processing in a printer driver.

Next, the image processing performed by the printer driver 91 of the host device will be explained with reference to FIG. 14.

When a print command is issued by the application program which operates on the host device, such as a personal computer, the print command is set to the printer driver 91. The kind of object is determined by the object determination processing 201 to input 200. Data is passed every object, image data 202 of a character, image data 203 of a line drawing, image data 204 of graphics, and image data 205 of an image, and processing is performed through each route.

That is, about character 202, line drawing 203, and graphics 204, it is a deed about color adjustment processing 206. And about a character, color matching processing 207, BG/UCR processing 209, total-amount restriction processing 211, and gamma correction processing 213 are performed, and character dithering (half tone processing) 215 is performed further. Color matching processing 208, BG/UCR processing 210, total-amount restriction processing 212, and gamma correction processing 214 are performed about line drawing and graphics, and graphics dithering (half tone processing) 216 is performed further.

On the other hand, about image 205, perform color judging and compression technology decision processing 221. And in the usual case, after performing color adjustment processing 222 and color matching processing 223, BG/UCR processing 224, total-amount restriction processing 225, and gamma correction processing 226 are performed, and error diffusion process (half tone processing) 227 is performed further.

After performing image infanticide processing 231, color adjustment processing 232, color matching processing 233a, or index loess processing (processing which does not perform color matching) 233b in the case of two or less colors, BG/UCR processing 224, total-amount restriction processing 225, and gamma correction processing 226 are performed, and error diffusion process (half tone processing) 227 is performed further.

It may branch, before resulting in color adjustment processing 206 about a line drawing and graphics, and it may shift to color matching processing 232 in the case of an image through ROP processing 241.

Thus, the image data processed for every object will be compounded by the one original image data again, and will be passed to an image forming device.

Each processing will be explained with reference to FIG. 15 through FIG. 18.

The CMM processing (color matching processing) is processing which performs conversion of image data from the RGB color space to the CMY color space. This processing applies the inputted RGB data to the lattice point of the nearest coordinates through interpolation operation using a three-dimensional solid grid as shown in FIG. 15, and the image data is replaced with the CMY data defined by the lattice point.

Figure 15:
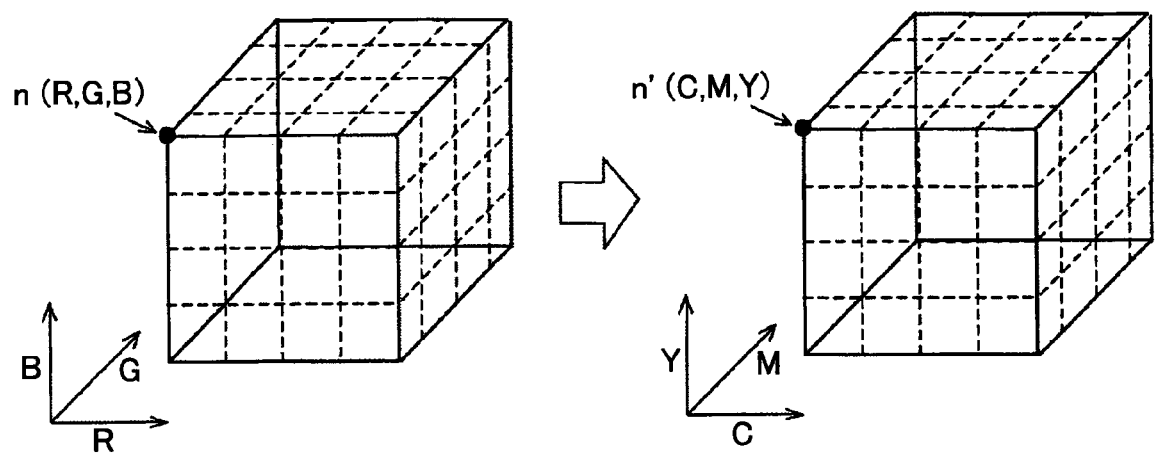
FIG. 15 is a diagram for explaining the color transform from RGB system to CMY system which is performed by the CMM processing.

Although FIG. 15 shows the cubic grid, using solid grids, such as a hexagon pillar and a tetrahedron, etc. is also known.

The BG/UCR processing is the processing to replace the level by which the CMY data overlaps by the component of K, so that the component of K is generated. Since this can cover the quantity of the three color inks CMY by the K ink of one color, it is effective in reducing the amount of the ink consumption, and the dark color becomes tight.

The total-amount restriction processing is the processing to calculate the amount of ink adhesion usable to print the image on the sheet. When it is determined that the calculated amount exceeds the maximum permissible amount, the image data is corrected so that the amount of ink adhesion for the corrected image data is less than the maximum permissible amount.

Figure 16:
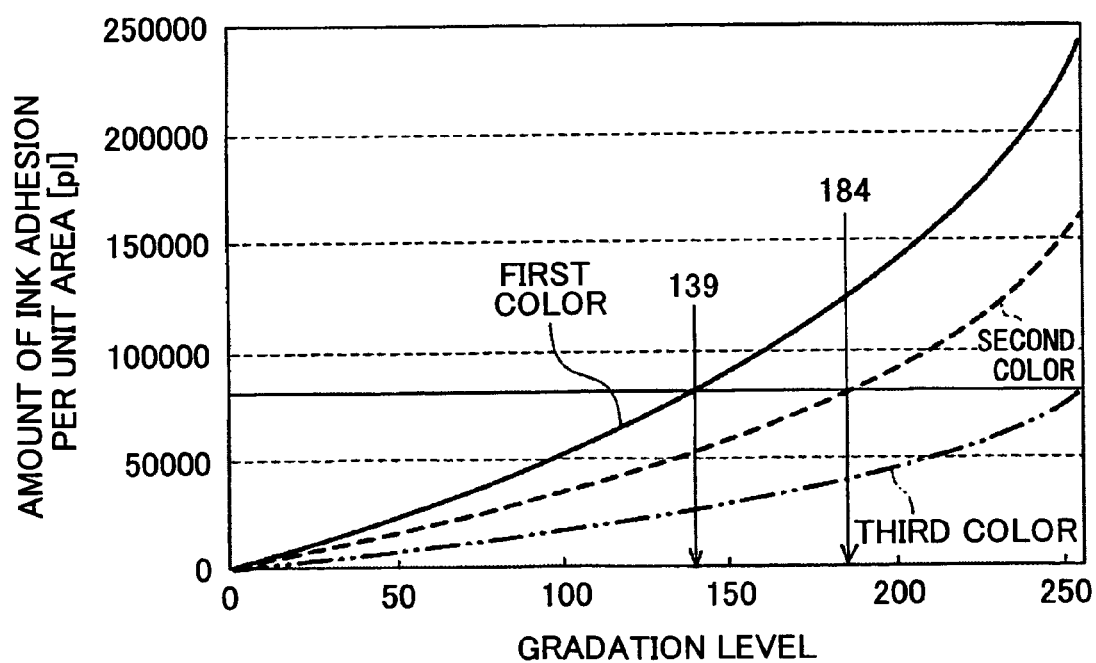
FIG. 16 is a diagram for explaining an example of total-amount restriction processing.

FIG. 16 shows an example of the total-amount restriction processing. For example, suppose that the amount of ink adhesion of the first color at the maximum gradation level is the maximum permissible amount. In the cases of the second color and the third color which are formed by two colors or three colors, the amount of ink adhesion thereof will be 2 to 3 times more than that of the first color by simple calculation, and it will exceed the maximum permissible amount. Then, the input image data is corrected so that the amount of ink adhesion for the corrected image data is less than the maximum permissible amount.

In the example of FIG. 16, the maximum for the color which constitutes the second color is settled down to the level of 184 gradation values, and the maximum for the color which constitutes the third color is settled down to the level of 139 gradation values. Of course, the corrected amount of ink adhesion is not limited to the example of FIG. 16, and it may vary according to the sheet and the ink, and the output conditions.

The half tone processing is the processing which transposes the value of a pixel to ON/OFF of a dot. Fundamentally, the gradation level of a pixel is compared with a threshold, and a dot is generated at the level of a pixel the gradation level of which exceeds the threshold, and no dot is generated at the level of a pixel the gradation level of which is less than the threshold. In this manner, the replacement (quantization) of the gradation level by ON/OFF of the dot generation is performed.

Generally, as the half tone processing, there are two major methods: the dithering processing which uses a threshold matrix, and the error diffusion processing which reflects the errors at the time of quantization in following pixel calculation. In recent years, to improve the granular feeling, the combinations of the ink dots which differ in size or in lightness are used, and the tone reproduction is raised from 1 bit to 2 bits (four gradation values).

FIG. 17 shows the gradation value reproduction range by the dot of each size in the dot size modulation for use in the image forming device.

As shown in FIG. 17, the width of the gradation value range where each dot is used is adjusted according to the dot size being formed. This is reflected in the threshold assignment of the thresholds of dithering processing or error diffusion processing in the half tone processing.

In the example of FIG. 17, it is assumed that each dot is formed in an ideal size. That is, gradation expression is performed by the small dots and blank in the range of zero to 85 gradation values, gradation expression is performed by the small dots and middle dots in the range of 86 to 170 gradation values, and gradation expression is performed by the middle dots and large dots in the range of 171 to 255 gradation values.

Figure 18A:
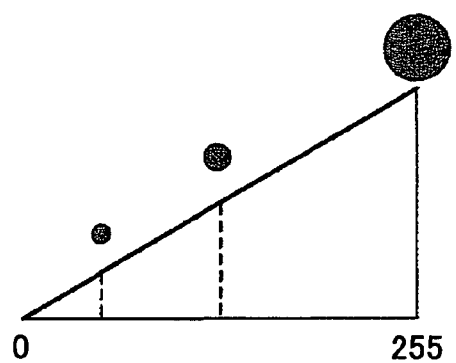
FIG. 18A and FIG. 18B are diagrams for explaining adjustment of the gradation value range to the variation in dot size.
Figure 18B:
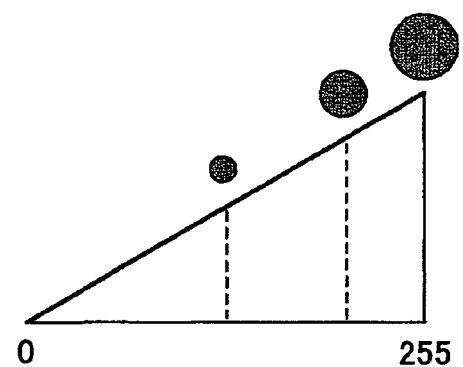

In this case, the ideal dot size is not necessarily realized depending on the performance of the printing head. However, if the gradation value range to be applied is adjusted as shown in FIG. 18A and FIG. 18B, then it is possible to realize desired characteristics. For example, the characteristics (lightness linear) that the lightness changes linearly in accordance with the gradation level can be realized. The characteristics of the half tone processing are reflected in the gradation reproduction concerning monochrome gradation value expression of CMYK. When monochrome is used, the gradation expansion processing is not necessary, or only the minimum gradation expansion processing may be performed. In this respect, the same discussion can be made to not only the dot size modulation method but also the lightness modulation method which uses light ink and dark ink in which the optical density differs and the color phase is the same.

It is the purpose that light ink and dark ink improve the granular feeling and the amount of ink adhesion of CMYK each color, and there is no change in standing in a row on the same hue as normal CMYK, Inc. fundamentally, and expressing a gradation value.

The invention reduces the bidirectional color difference of K and a color by BG/UCR processing in this image processing.

Figure 19A:
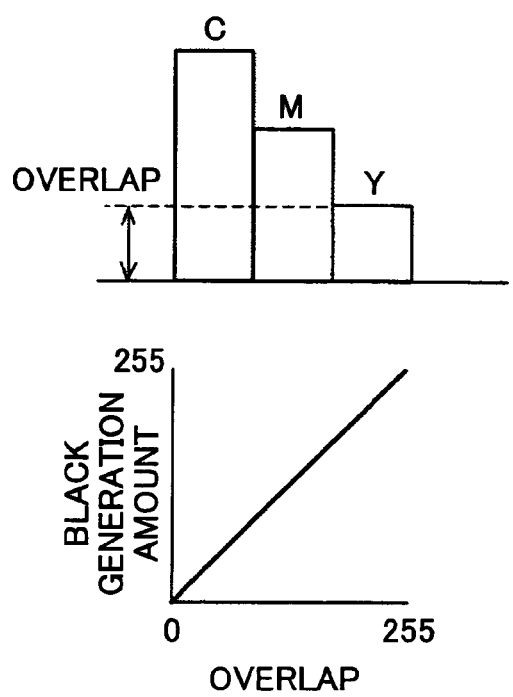
FIG. 19A and FIG. 19B are diagrams for explaining 100% BG/UCR processing.
Figure 19B:
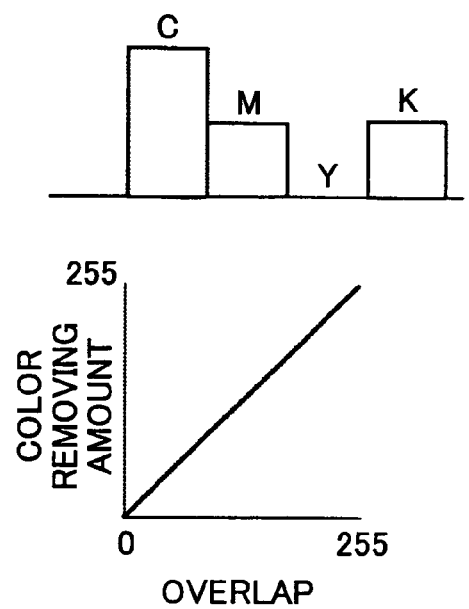

FIG. 19A and FIG. 19B show the fundamental case in which the 100% BG/UCR processing is performed. In the 100% BG/UCR processing, the concept that when the three colors of CMY overlap they become black by subtractive mixture is utilized. As shown in FIG. 19B, the processing is performed such that the overlap areas in the CMY of FIG. 19A are transposed to the K ink and the overlap areas are subtracted from the C, M and Y colors.

However, if the K ink is used in a highlight part of an image, the dots of the part will be conspicuous and a granular feeling will get worse. To avoid the problem, it is preferred that the actual BG/UCR processing is performed, as shown in FIG. 20A and FIG. 20B, such that the gradation level where the addition of black ink is started (black generation start level), is delayed and the amount of the black ink for the highlight part is formed by the composite black of CMY which makes the dots less conspicuous.

In the example of FIG. 20A and FIG. 20B, the amount of BG and the amount of UCR are different from each other. This is because sufficient optical density is not kept only by the K ink and such optical density is compensated for by the composite black of CMY.

The bidirectional color difference of the K ink and the color ink occurs between the CMY composite black and the K black. For this reason, if the 100% BG/UCR processing is applied, the problem can be eliminated theoretically, but the image characteristics, such as a granular feeling and black density, will fall greatly.

To resolve the above problem, in the image processing method of the invention, the bidirectional color difference between K ink and color ink is reduced by applying the BG/UCR processing in which the black generation start level is delayed as much as possible at the time of bidirectional printing.

Since the gradation value range expressed only by the composite black of CMY becomes long by delaying the black generation start level, the bidirectional color difference does not occur in this gradation value range. Since the dark-colored high gradation part at which the addition of K ink is started becomes close to black substantially, the outputted image can have the characteristics that the color difference is not easily conspicuous.

However, delaying the black generation start level simply is not always appropriate. FIG. 21 shows the combinations of the dot sizes of K ink and color ink in the above-mentioned multi-level gradation processing (four values) of FIG. 17.

In the example of FIG. 21, the four steps of dot sizes, including blank dots, small dots, middle dots, and large dots, can be formed, and the combinations of A through I are considered as the combinations of K ink and color ink.

The combinations of D, G, and H are not substantially generated by delaying the black generation start level. The plain paper is likely to swell with moisture of the ink, and problems, such as cockling and jamming, are likely to occur with the plain paper. It can be said from a viewpoint of the total-amount restriction that the combinations of F and I which are the combinations of large dots (about 300 to 400%) are not generated.

Figure 22:
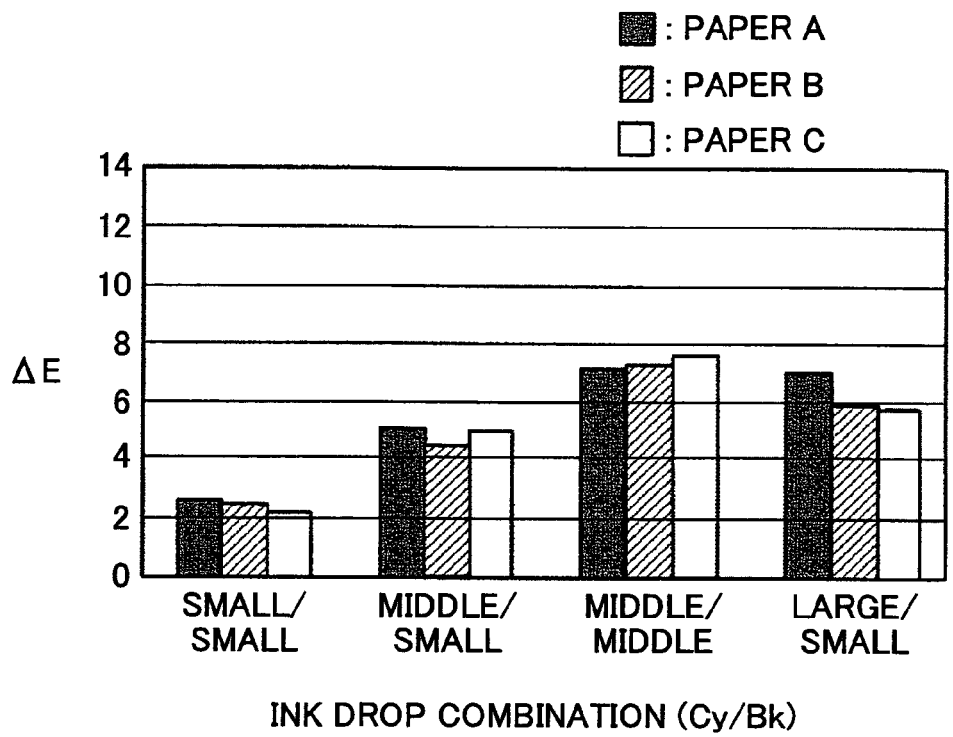
FIG. 22 is a diagram for explaining the results of measurement of the bidirectional color difference for the combinations of the dot sizes.

FIG. 22 shows the results of measurements of the bidirectional color difference for the remaining combinations of the dot sizes.

As shown in FIG. 22, when the sizes of K dot and color dot are equivalent or the size difference is one or more steps, it is in the tendency that the bidirectional color difference becomes large. The combination of small/small dots has the low gradation level, and the value of color difference is small. However, the combination of middle/middle dots has a large value of color difference. Thus, the combinations of the dot sizes which are equivalent are considered to be no good (NG).

In the example of FIG. 22, paper A is the TYPE6200 (product name), paper B is the MyPaper (product name), and paper C is the CopyPlus (product name), respectively.

Figure 23:
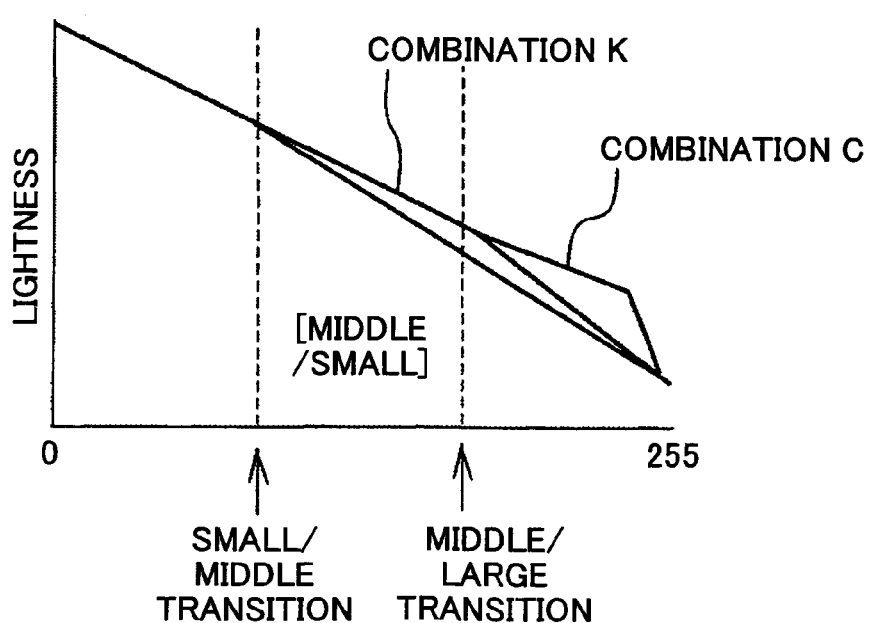
FIG. 23 is a diagram for explaining results of measurement of the lightness characteristics when delaying the black generation start level.

FIG. 23 shows the results of measurement of the lightness characteristics to the black data in the combinations of K and C.

The lightness of the composite black of CMY begins to be saturated when the gradation level becomes high to some extent. The change of the lightness under the condition of the combination of K is not noticeable. However, the change of the lightness under the condition of the combination of C appears conspicuous by the black generation processing. Namely, it is turned out that if the black generation start level is delayed too much, a problem arises in the gradation value characteristics.

Based on the above experimental results, the black generation processing in the BG/UCR in this embodiment of the invention is performed as follows.

(1) The black generation start level is delayed by one or more steps to a shadow-side level from the multi-level transition level of the color ink at which the bidirectional color difference may occur.

(2) When the number of multiple values which can be expressed in the multi-level gradation expression is equal to "n" (n>3), the black generation start level is set to a highlight-side level from the (n−1)-th transition level.

In this case, the reason for setting the number n of multiple levels as being larger than 3 is that, in the case of n=3, the transition occurs only 1 time, and the lightness balance is such that the gradation level where the transition occurs itself is shifted to a highlight-side level from the level when n>=4, and the black generation can be started before the lightness saturation of the composite black of CMY starts.

In other words, the black generation gradation level is restricted according to the invention, and a gap of the lightness characteristics between the gradation value range which is expressed with the composite black of CMY and the gradation value range which is expressed with CMYK and black ink is mixed can be restricted to the minimum.

Usually, there is an upper limit in the total amount of ink that can be used on the plain paper, and the use of the composite black with the combination of the largest drops does not usually occur. It is possible to prevent the problem that if the black generation start level is delayed too much, the composite black of CMY is saturation by the total-amount restriction and a difference from the composite black of CMYK after the start of black generation processing becomes too large.

Suppose that the processing of the item (1) above (the black-generation start level is delayed by one or more steps to the shadow side level from the multi-level transition level of the color ink used as the candidate for bidirectional color difference) is applied to the example of FIG. 17. The black-generation start level in this case is delayed by one or more steps from the transition level of 85 gradation values where a transition from the gradation level expressed with the small dots only to the gradation level expressed with the small dots and the middle dots occurs, to a shadow-side level, i.e., the level of 86 or more gradation values.

Similarly, in the example of FIG. 17, the black-generation start level is delayed by one or more steps from the transition level of 170 gradation values where a transition from the gradation level expressed with the middle dots only to the gradation level expressed with the middle dots and the large dots occurs, to a shadow-side level, i.e., the level of 171 or more gradation values.

Suppose that the processing of the item (2) above (when the number of multiple values which can be expressed in the multi-level gradation expression is equal to "n" (n>3), the black generation start level is set to a highlight-side level from the (n−1)-th transition level) is applied to the example of FIG. 17. The black-generation start level in this case is set from the 3rd transition level of 170 gradation values where a transition from the gradation level expressed with the middle dots only to the gradation level expressed with the middle dots and the large dots occurs, to a highlight-side level (i.e., the level of 169 gradation values or smaller).

Taking into consideration the relation of the processing of the items (1) and (2) above, the black-generation start level in the example of FIG. 17 is set to an intermediate level between the level of 86 gradation values and the level of 169 gradation values containing the small dots and the middle dots.

As mentioned above, occurrence of bidirectional color difference largely depends on the characteristics of the sheet and the ink. For example, in the case of a glossy sheet or a coated paper on which the bidirectional color difference does not occur or cannot be easily conspicuous, it is not necessary to delay the black generation start level. In order to obtain good quality of the output image, it is preferred to perform the BG/UCR processing which is optimized according to the kind of each sheet. Therefore, it is preferred to select one of the BG/UCR processing parameters according to the kind of the sheet being used.

In respect of tightness of the black, a difference will appear in image quality between the uni-directional printing and the bidirectional printing when the start timing of black generation in the case of the bidirectional printing is delayed.

To obviate the problem, the black generation processing may be configured so that choosing the BG/UCR for the bidirectional printing is enabled even at the time of the uni-directional printing (which is, for example, specified in the printing property of the printer driver). In this case, the image quality can be unified between the time of the uni-directional printing and the time of the bidirectional printing.

By choosing the BG/UCR processing for the bidirectional printing in the case of an image in which the contrast is too conspicuous, the outputted image in which the contrast is suppressed a little can be obtained. Also in this meaning, the advantageous effect can be acquired by the above configuration of the black generation processing in which choosing the BG/UCR for the bidirectional printing is enabled even at the time of the uni-directional printing.

As mentioned above, CMM processing and BG/UCR processing are separate from each other, but BG/UCR processing may be unified or contained in CMM processing.

For example, if the conversion relational expression of FIG. 15 is used, it can be expressed by the formula: n(R, G, B)=n'(C, M, Y)=n"(C, M, Y, K). The data of K after the BG/UCR processing can be directly put into the CMM translation table.

In this case, the CMM processing which consequently delays the black-generation start level will be performed. Since the black-generation start level in this case is the same as the BG/UCR processing mentioned above, a description thereof will be omitted.

Next, the image processing method in an embodiment of the invention will be explained with reference to FIG. 24.

Figure 24:
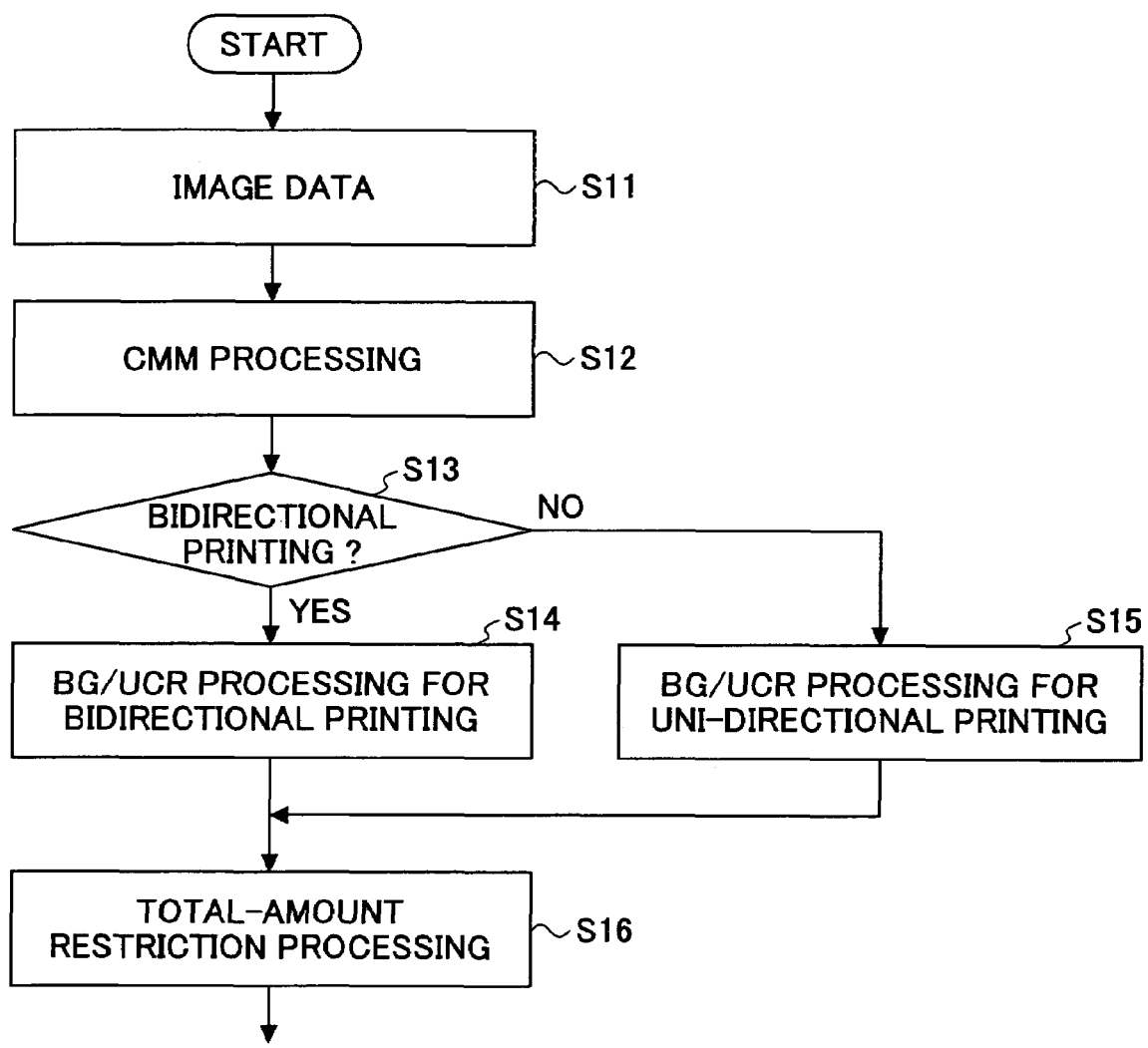
FIG. 24 is a flowchart for explaining an image processing method in an embodiment of the invention.

As shown in FIG. 24, image data are inputted (S11). The CMM processing to the input image data is performed using the color space transform table (S12).

Next, it is determined whether the bidirectional printing is specified in the input image data (S13).

When the bidirectional printing is specified, the above-mentioned BG/UCR processing for the bidirectional printing in which the black-generation start level is delayed to the shadow side level from that for the uni-directional printing is performed (S14).

On the other hand, when the bidirectional printing is not specified but the uni-directional printing is specified, the BG/UCR processing for the uni-directional printing (optimized) in which the black-generation start level is not delayed is performed (S15).

The processing after the next total-amount restriction processing (S16) is the same as the image processing which is respectively performed by the total-amount restriction unit 133, the gamma correction unit 134, the zooming unit 135, and the half tone processing unit 136, which are provided in the image processing device of FIG. 12, and a description thereof will be omitted.

Thus, by delaying the start level of black generation in the case of the bidirectional printing to the shadow side level, the timing of using the black ink which may be the cause of bidirectional color difference is restricted to the shadow side where the color difference itself becomes difficult to be conspicuous, and the bidirectional color difference due to the unsymmetrical arrangement of the black ink nozzle can be reduced.

Next, the image processing method in an embodiment of the invention will be explained with reference to FIG. 25.

Figure 25:
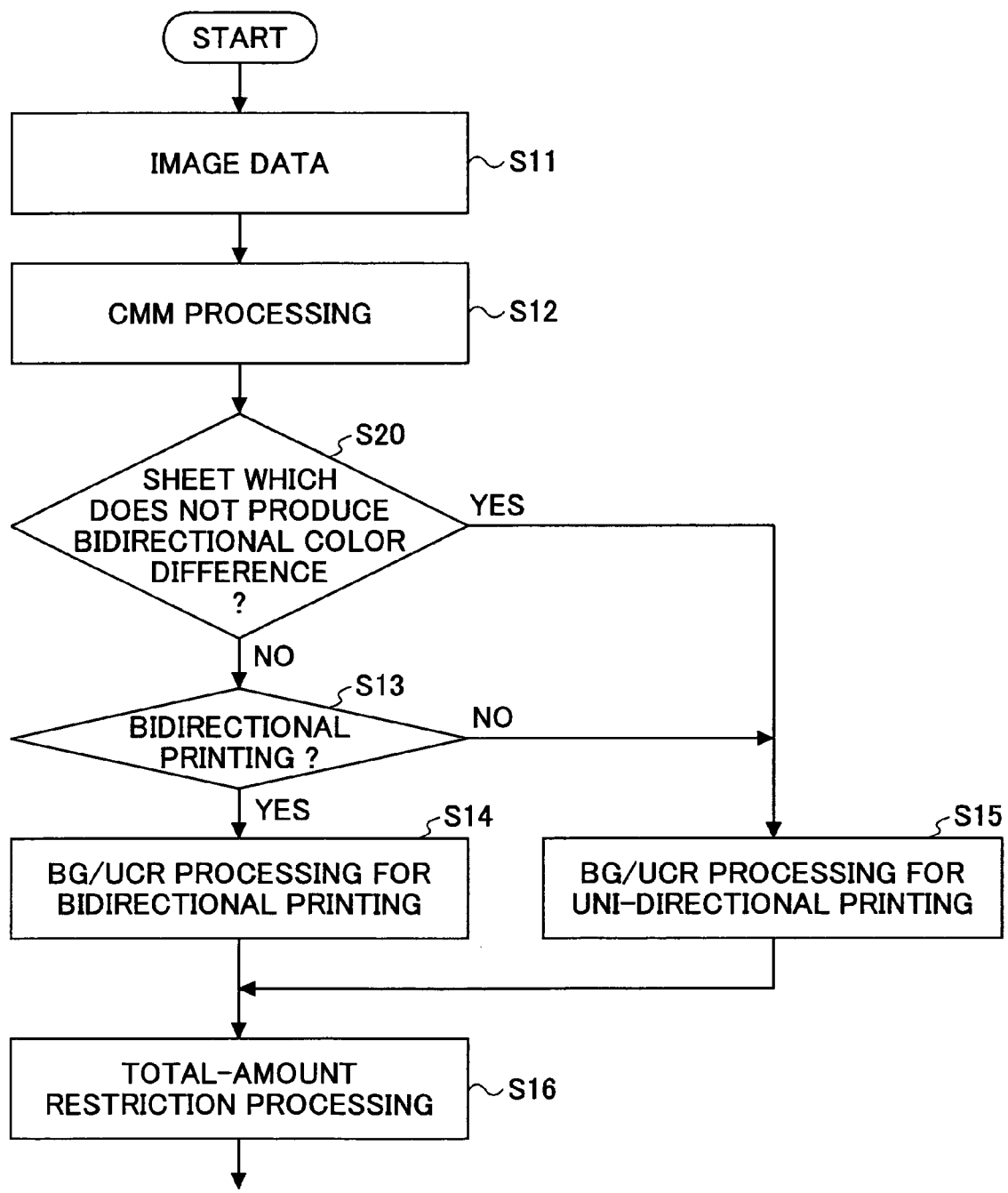
FIG. 25 is a flowchart for explaining an image processing method in an embodiment of the invention.

As shown in FIG. 25, image data are inputted (S11). Next, the CMM processing to the input image data is performed using the color space transform table (S12).

Next, it is determined whether the sheet used is a sheet that does not easily produce the bidirectional color difference due to the unsymmetrical arrangement of the nozzle for black ink, such as a glossy sheet or a coated sheet, as mentioned above (S20).

When it is determined at step S20 that the sheet used is not a sheet which does not easily produce the bidirectional color difference, the processing in the flowchart of FIG. 24 is followed. Namely, it is determined whether the bidirectional printing is specified in the input image data (S13).

When the bidirectional printing is specified, the BG/UCR processing for the bidirectional printing in which the black-generation start level is delayed to the shadow side level from the level in the case of the uni-directional printing is performed (S14).

On the other hand, when it is determined at step S20 that the sheet used is a sheet which does not easily produce the bidirectional color difference, or when the bidirectional printing is not specified but the uni-directional printing is specified at step S13, the BG/UCR processing for the uni-directional printing (optimized) in which the black-generation start level is not delayed is performed (S15).

Since the processing after the next total-amount restriction processing (S16) is the same as the image processing which is respectively performed by the total-amount restriction unit 133, the gamma correction unit 134, zooming unit 135, and the half tone processing unit 136, which are provided in the image processing device of FIG. 12, a description thereof will be omitted.

Thus, the BG/UCR processing is changed according to the kind of the sheet, under the environment which uses both the sheet (such as a glossy sheet or a coated paper in which the bidirectional color difference is not conspicuous) and the plain paper. The optimized BG/UCR processing can be performed according to the sheet kind, and good image quality can be acquired for each sheet kind.

In the flowcharts of FIG. 24 and FIG. 25, the determination step (S13) of the bidirectional printing or the uni-directional printing, and the determination step (S20) of the sheet which does not easily produce the color difference or the sheet which easily produce the color difference are provided. These determination steps are performed based on the combination information registered beforehand in the database of the printer driver or the processing module.

In the above-mentioned embodiment, the printer driver is a computer-readable program of the invention which, when executed by a computer, causes the computer to perform the image processing method of the invention. Alternatively, the image forming device may be configured so that the image forming device itself has a control unit which performs the image processing method of the invention described above.

Alternatively, an application-specific integrated circuit (ASIC) which performs the image processing method of the invention may be provided as the above-mentioned control unit in the image forming device.

In an embodiment of the invention which solves or reduces one or more of the previously described problems of the related art, there is provided an image forming device which comprises a printing head in which first nozzles for ejecting color ink drops are arranged in a symmetrical formation to forward and backward scanning directions and second nozzles for ejecting black or gray ink drops are arranged in an unsymmetrical formation with respect to the first nozzles, wherein the image forming device is adapted to perform a uni-directional printing or a bidirectional printing with the printing head, and adapted to use multi-level gradation expression by changing ink drop size or using inks with a same hue and different optical densities, and wherein the image forming device further comprises a control unit configured to perform a black generation processing to input data, and to delay, when performing the black generation processing, a black-generation start level for the bidirectional printing to a shadow-side gradation level from a black-generation start level for the uni-directional printing.

The above-mentioned image forming device may be configured so that the control unit is an application-specific integrated circuit.

Next, an example of the image forming device (multi-function peripheral) having the multiple image-formation functions including the function of the ink-jet printing device will be explained with reference to FIG. 26.

Figure 26:
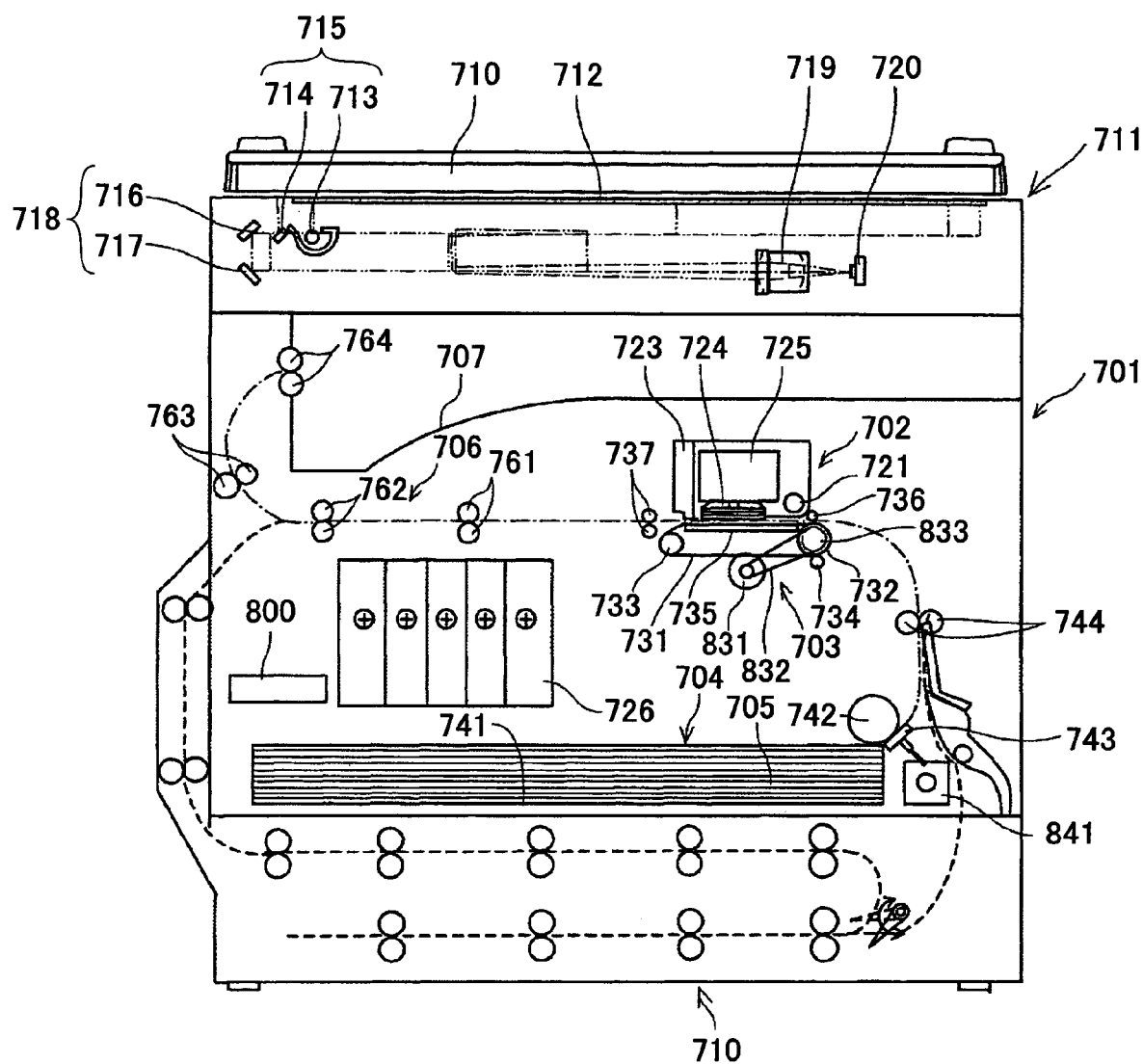
FIG. 26 is a diagram showing the composition of an image forming device in an embodiment of the invention.

As shown in FIG. 26, this image forming device has image formation part 702 and sub-scan transport part 703 for forming an image in the inside of the device body 701 (the inside of the housing).

The image formation part 702 and sub-scan transport part 703 are collectively called printer engine unit. It feeds paper at a time to one printing medium (sheet) 705 from feeding part 704 provided in the bottom of the device body 701.

The sheet 705 is delivered by the sub-scan transport part 703 in the level which counters the image formation part 702. After ejecting the ink drop to the sheet 705 and forming a desired image thereon by the image formation part 702, the sheet 705 is delivered to the paper output tray 707 in the upper part of the device body 701 through the sheet ejection part 706.

At the time of double-side printing, the sheet 705 for which single side printing is completed is sent into downward double-sided printing unit 710 from the side of the device body 701 through the sheet ejection part 706.

After printing by switch-backing in the double-sided printing unit 710, sending the sheet 705 into the sub-scan transport part 703, and on the other hand boiling it again, paper is delivered to the sheet 705 on paper output tray 707.

This image forming device is provided with the image reader part (scanner part) 711 for reading an image above paper output tray 707 in the upper part of the device body 701 as an input system of the image data (print data) formed by image formation part 702.

The scanning optical system 715 in which this image reader part 711 contains the light source 713 and the mirror 714.

The scanning optical system 718 containing mirrors 716 and 717 moves, and the image of the document laid on contact glass 712 is read.

It is read as an image signal with image reading element 720 which the scanned document image has arranged behind lens 719, and image processing of the read image signal is digitized and carried out, and it can print the print data which carried out image processing.

The image forming device has the pressure plate 710 for pressing down a document on the contact glass 712, as an input system of the data (print image data) of the image formed by the image formation part 702.

The information processing device which is an image processing device, such as an external personal computer, is adapted for receiving the print data via a cable or a network, and receiving the data containing the print image data from the host device side, such as imaging devices, such as image readers, such as an image scanner, and a digital camera, can be processed and printed.

The image formation part 702, like the ink-jet printing device mentioned above, has the guide rod 721 on the carriage 723 movable in the main scanning direction (which is perpendicular to the sheet transport direction). The printing head 724 for ejecting the droplets of different colors, respectively is carried.

The carriage 723 is moved in the main scanning direction according to a carriage scanner, and it is considered as the shuttle type which makes droplet breathe out from printing head 724, and performs image formation, sending the sheet 705 to a sheet transport direction (the direction of feed) by sub-scan transport part 703.

The printing head 724 is a head of the unsymmetrical arrangement from which the nozzle of black ink is not symmetrical arrangement to the nozzle of color ink as well as printing head 14 mentioned above, and the ink of each color is supplied from subtank 725 carried in carriage 723, respectively.

Supplement supply of the ink to the subtank 725 is carried out via the tube (which is not illustrated) from the ink cartridge 726 of each color which is a main tank detachably mounted in the device body 701.

In the sub-scan transport part 703, the transport roller 732 is provided for transporting the sheet 705 fed from the lower part, and changing the sheet transport direction about 90 degrees to counter the image formation part 702, and the endless transport belt 731 is wound between the transport roller 732 (which is a driving roller) and the driven roller 733. The charging roller 734 is provided to supply the AC bias for charging the surface of the transport belt 731.

The guide member 735 is provided to guide the transport belt 731 in the range in which the image formation part 702 counters. The transport roller 737 is provided for sending out the sheet 705 on which the image is formed by the image formation part 702, to sheet ejection part 706 with the pressurizing roller 736 which pushes the sheet 705 against the transport belt 731 in the level which counters the transport roller 732.

The transport belt 731 of this sub-scan transport part 703 comprises that transport roller 732 rotates via timing belt 832 and timing roller 833 from the sub-scan motor 831 so that it is rotated in the sub-scanning direction. The sheet feeding part 704 is provided so that it can take out and insert the sheet 705 to the device body 701 from the sheet paper cassette 741 in which a number of sheets 705 are held.

The feeding roller 742 and the friction pad 743 for separating and sending out one sheet of the sheets 705 in the sheet paper cassette 741 at a time. The sub-scan transport roller 744 delivers the sheet 705 to which paper is fed to the sub-scan transport part 703. The feeding roller 742 is rotated by the sub-scan motor 841 (which is an HB type stepping motor) via the feed clutch (which is not illustrated). The sub-scan transport roller 444 is also rotated by the sub-scan motor 841.

The sheet ejection part 706 includes the sheet ejection roller pair 761, 762 for delivering the sheet 705 on which the image is formed, the sheet ejection roller pair 763 for sending out the sheet 705 to the paper output tray 707, and the ejection roller pair 764.

Next, the composition of the control unit of the image forming device of FIG. 26 will be explained with reference to FIG. 27.

Figure 27:
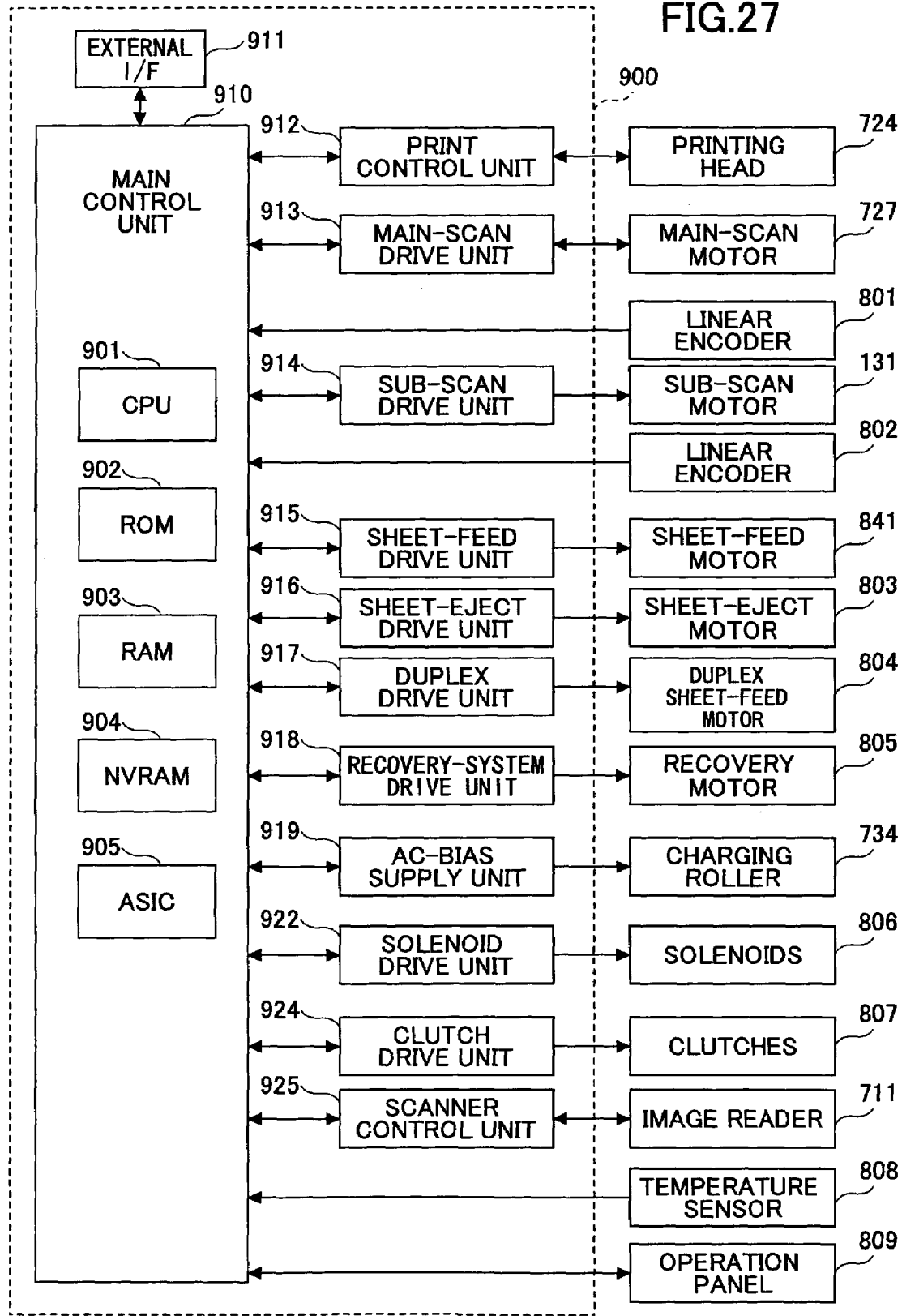
FIG. 27 is a block diagram showing the composition of a control unit of the image forming device in FIG. 26.

As shown in FIG. 27, the control unit 900 has a main control unit 910 which controls the whole image forming device. The main control unit 910 is provided with the following. The CPU 901, the ROM 902 which stores the program executed by the CPU 901 and other fixed data, the RAM 903 which stores image data temporarily, the nonvolatile memory (NVRAM) 904 for holding data while the power supply of device is turned off, and the ASIC 905 which performs image processing concerning the invention and half tone processing to the input image.

The control unit 900 is further provided with the following. The external I/F 911 for intervening between the main control unit 910 and the host device, and performing transmission and reception of data and signals. The print controller 912 containing the head driver for carrying out drive control of the printing head 724. The main-scan drive unit (motor driver) 913 for driving the main-scan motor 927 which carries out the movement scan of the carriage 923. The sub-scan drive unit 914 for driving the sub-scan motor 731. The sub-scan drive unit 915 for driving the sub-scan motor 841. The sheet-eject drive unit 916 for driving the sheet-ejection motor 803 which drives each roller of the sheet ejection part 706. The duplex drive unit 917 for driving the duplex sheet-feeding motor 804 which drives each roller of the double-sided printing unit 710. The recovery system drive unit 918 for driving the recovery motor 805 which drives the recovery mechanism. The AC bias supply unit 919 for supplying the AC bias to the charging roller 734.

The control unit 900 is further provided with the following. The solenoid drive unit (driver) 922 which drives various kinds of solenoids (SOL) 806. The clutch drive unit 924 which drives various sheet-feeding electromagnetic clutches 323. The scanner control unit 925 which controls the image reader part 711.

The main control unit 910 inputs the detection signal of the temperature sensor 808 which detects the temperature of the transport belt 731 mentioned above. Also, the detection signals of various other sensors are inputted to the main control unit 910, but the illustration thereof is omitted.

The main control unit 910 performs the input processing of the given key inputs and the output processing of the display information with respect to the operation panel 809 containing the various keys, such as ten keys and a print start key, and the various indicators provided in the device body 701.

The output signal (pulse) of the linear encoder 801 for detecting the movement amount and moving speed of the carriage 723, is inputted into the main control unit 910. The output signal (pulse) of the rotary encoder 802 for detecting the movement amount and moving speed of the transport belt 731, is inputted into the main control unit 910.

The main control unit 910 carries out drive control of the main-scan motor 727 and the sub-scan motor 731 via the main operation drive unit 913 and the sub-scan drive unit 914 based on the respective output signals and the correlation of the output signals, so that the carriage 723 is moved and the transport belt 731 is moved to transport the sheet 705.

The image formation operation in the above-described image forming device will be explained briefly.

Since the charging roller 734 is in contact with the insulating layer (surface) of the transport belt 731 by impressing the high voltage in the square waveform of the positive and negative poles which are the alternating voltage to the charging roller 734 from the AC bias supply unit 919.

Positive and negative charge are supplied to the transport belt 731 in a beltlike pattern in the belt transport direction, charging is performed in a predetermined charging width on the transport belt 731, and a non-uniform electric field is generated on the surface of the transport belt 731.

When the sheet 705 from the sheet feeding part 704 is delivered to the transport belt 731 in which the non-uniform electric field is generated by forming the electric charge of positive and negative poles, it is pressed between the transport roller 732 and the roller 736. The sheet 705 is polarized at this instant in the direction of the electric field, and attracted by the transport belt 731 due to the electrostatic attracting force, and the sheet 705 is delivered to follow the movement of the transport belt 731.

And while the sheet 705 is transported intermittently with the transport belt 731, the drops of the printing liquid are ejected from the printing head 724 to the sheet 705 according to the print data, so that an image is formed (printing). The front end part of the sheet 705 on which the image is formed is separated from the transport belt 731 by the separation pad, and the sheet 705 is delivered to the paper output tray 707 by the sheet ejection part 706.

In the above image forming device, the document image read by the scanner part 711 is used as an inputted image. As described above, at the time of bidirectional printing, the BG/UCR processing which delays the black-generation start level to the shadow side is performed, and the timing of using the black ink which may cause the bidirectional color difference will be limited to the shadow side in which the color difference itself becomes difficult to be conspicuous, and the bidirectional color difference due to the unsymmetrical arrangement of the black ink nozzle can be reduced. In this case, the image forming device may be provided with an application-specific integrated circuit which is adapted to perform the above-mentioned image processing.

The present invention is not limited to the above-described embodiments, and variations and modifications may be made without departing from the scope of the present invention.

Further, the present application is based on and claims the benefit of priority of Japanese patent application No. 2005-304351, filed on Oct. 19, 2005, and Japanese patent application No. 2006-182201, filed on Jun. 30, 2006, the entire contents of which are hereby incorporated by reference.

What is claimed is:

1. An image processing method which performs processing to generate image data based on input data and output the image data to an image forming device, the image forming device including a printing head in which first nozzles for ejecting color ink drops are arranged in a symmetrical formation to forward and backward scanning directions and second nozzles for ejecting black or gray ink drops are arranged in an unsymmetrical formation with respect to the first nozzles for ejecting color ink drops, and adapted to perform a uni-directional printing or a bidirectional printing with the printing head, the image processing method comprising the steps of:

performing a black generation processing to the input data; and delaying, when performing the black generation processing, a black-generation start level for the bidirectional printing to a shadow-side gradation level from a black-generation start level for the uni-directional printing.

2. The image processing method according to claim 1, wherein the black-generation start level for the bidirectional printing is delayed by one or more steps to the shadow-side gradation level from a multi-level transition level for using a color ink which causes a bidirectional color difference.

3. The image processing method according to claim 1, wherein, when the number of multiple values in multi-level gradation expression is equal to n (n>3), the black-generation start level is set in a highlight-side level from a (n−1)-th transition level.

4. The image processing method according to claim 1, wherein the image processing method is adapted to perform, when performing the uni-directional printing, the black generation processing in which the black-generation start level is delayed to the shadow-side gradation level.

5. The image processing method according to claim 1, wherein, when performing the bidirectional printing according to a kind of a sheet, it is determined whether the black generation processing in which the black-generation start level is delayed is performed or not.

6. The image processing method according to claim 1, wherein the black generation processing is contained in a color transform processing which performs a color transform processing to the input data.

7. A computer-readable program which, when executed by a computer, causes the computer to perform an image processing method which performs processing to generate image data based on input data and output the image data to an image forming device, the image forming device including a printing head in which first nozzles for ejecting color ink drops are arranged in a symmetrical formation to forward and backward scanning directions and second nozzles for ejecting black or gray ink drops are arranged in an unsymmetrical formation with respect to the first nozzles for ejecting color ink drops, and adapted to perform a uni-directional printing or a bidirectional printing with the printing head, the image processing method comprising the steps of:

performing a black generation processing to the input data; and delaying, when performing the black generation processing, a black-generation start level for the bidirectional printing to a shadow-side gradation level from a black-generation start level for the uni-directional printing.

8. An image processing device which performs processing to generate image data based on input data and output the image data to an image forming device, the image forming device including a printing head in which first nozzles for ejecting color ink drops are arranged in a symmetrical formation to forward and backward scanning directions and second nozzles for ejecting black or gray ink drops are arranged in an unsymmetrical formation with respect to the first nozzles, and the image forming device being adapted to perform a uni-directional printing or a bidirectional printing with the printing head, and adapted to use multi-level gradation expression by changing ink drop size or using inks with a same hue and different optical densities, wherein the image processing device comprises a control unit configured to perform a black generation processing to the input data, and to delay, when performing the black generation processing, a black-generation start level for the bidirectional printing to a shadow-side gradation level from a black-generation start level for the uni-directional printing.

* * * * *